United States Patent
Naidu et al.

(10) Patent No.: US 10,325,599 B1
(45) Date of Patent: Jun. 18, 2019

(54) MESSAGE RESPONSE ROUTING

(71) Applicant: AMAZON TECHNOLOGIES, INC., Seattle, WA (US)

(72) Inventors: Pathivada Rajsekhar Naidu, Seattle, WA (US); Tony Roy Hardie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/392,271

(22) Filed: Dec. 28, 2016

(51) Int. Cl.
| | |
|---|---|
| G10L 15/00 | (2013.01) |
| G10L 15/30 | (2013.01) |
| G10L 15/18 | (2013.01) |
| G06F 17/27 | (2006.01) |
| G10L 13/04 | (2013.01) |
| H04W 4/12 | (2009.01) |
| H04M 7/00 | (2006.01) |

(52) U.S. Cl.
CPC ............ *G10L 15/30* (2013.01); *G06F 17/278* (2013.01); *G10L 13/043* (2013.01); *G10L 15/1815* (2013.01); *H04M 7/0042* (2013.01); *H04W 4/12* (2013.01)

(58) Field of Classification Search
CPC ...... H04M 1/575; H04M 3/533; G10L 15/265
USPC ...................................................... 379/88.04
See application file for complete search history.

(56) References Cited

U.S. PATENT DOCUMENTS

| | | | | |
|---|---|---|---|---|
| 7,251,313 B1 * | 7/2007 | Miller | ............... | H04M 3/53333 379/281 |
| 8,238,528 B2 * | 8/2012 | Zafar | ............... | H04M 1/72547 379/88.23 |
| 8,923,491 B2 * | 12/2014 | MacWan | ............... | G10L 15/265 379/88.01 |
| 2008/0045256 A1 * | 2/2008 | Wang | ............... | H04W 4/16 455/518 |
| 2011/0172989 A1 * | 7/2011 | Moraes | ............... | G06Q 10/107 704/9 |
| 2015/0326720 A1 * | 11/2015 | Agrawal | ............... | H04M 3/44 455/414.1 |

* cited by examiner

*Primary Examiner* — Daniel Abebe
(74) *Attorney, Agent, or Firm* — Pierce Atwood LLP

(57) ABSTRACT

Systems and methods for extracting contact information from a message are described. A system can receive a message for a recipient, where the message originates from a message source having a first contact identifier (i.e., phone number, text address, etc.). The system can determine text data associated with the content of that message and process the text data to determine that the message refers to a second contact identifier that is different from the first contact identifier. The system may output the message to a recipient device (such as using text-to-speech, etc.) and may store an association between the message source and the second contact identifier. When the recipient speaks a command to reply to the first message or contact the message source, the system may determine the reply is intended for the message source and may route the reply using the second contact identifier included in the first message.

19 Claims, 16 Drawing Sheets

FIG. 1
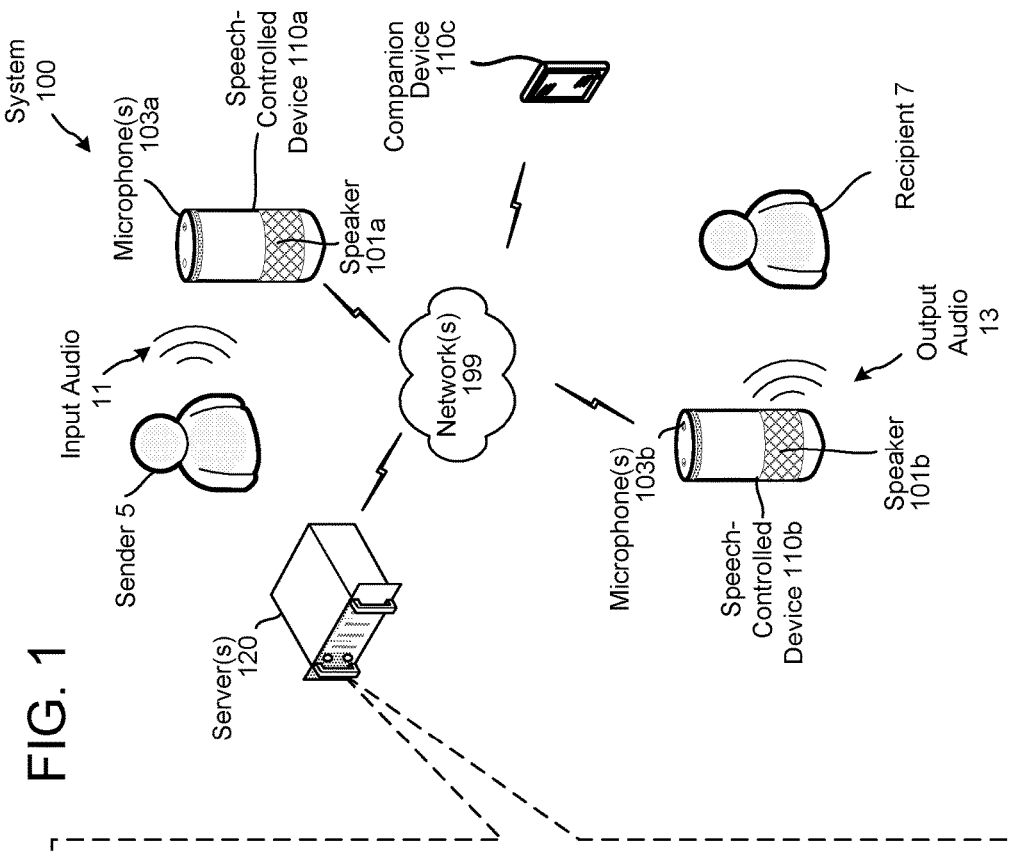
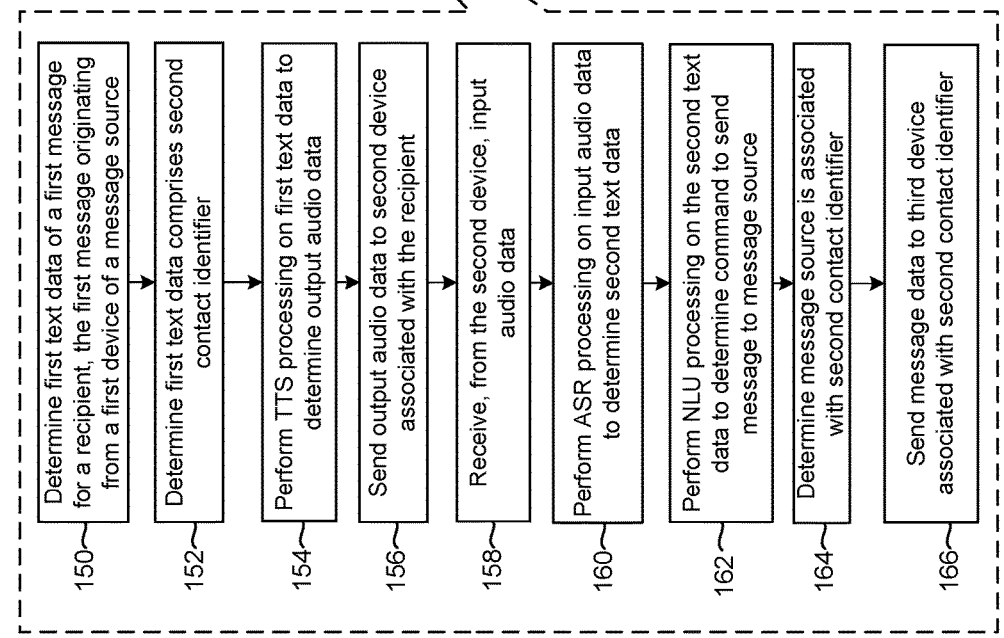

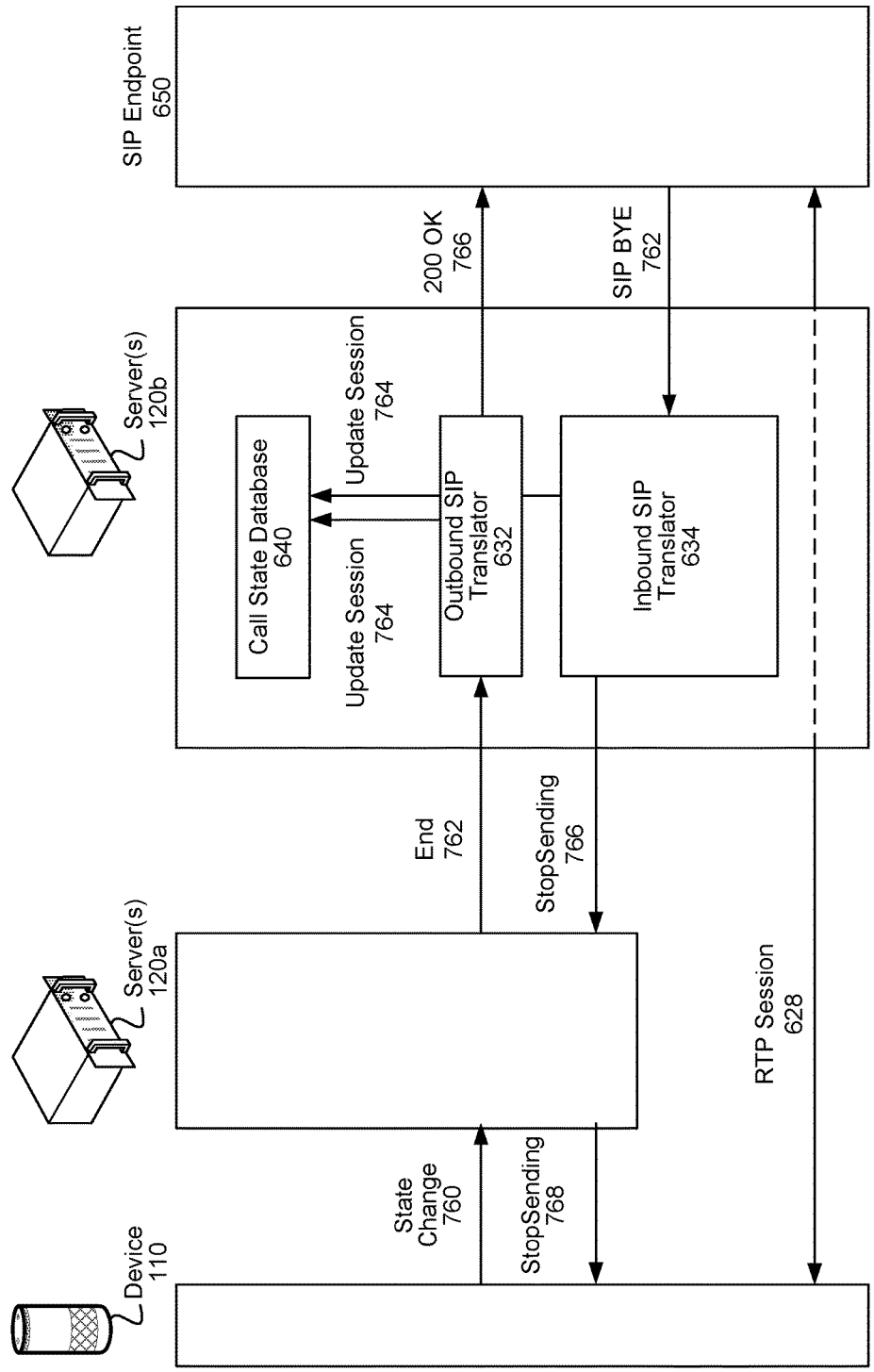

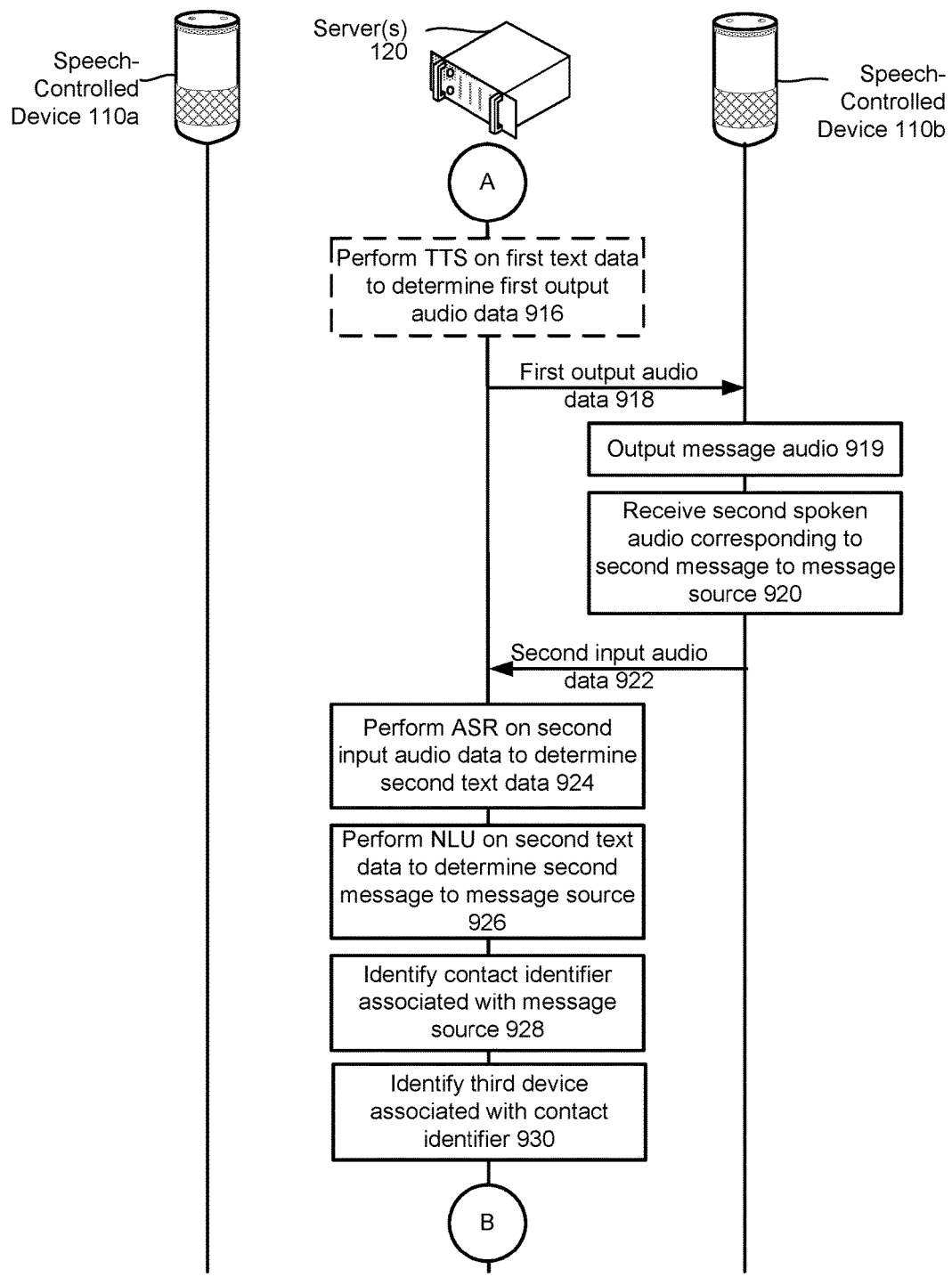

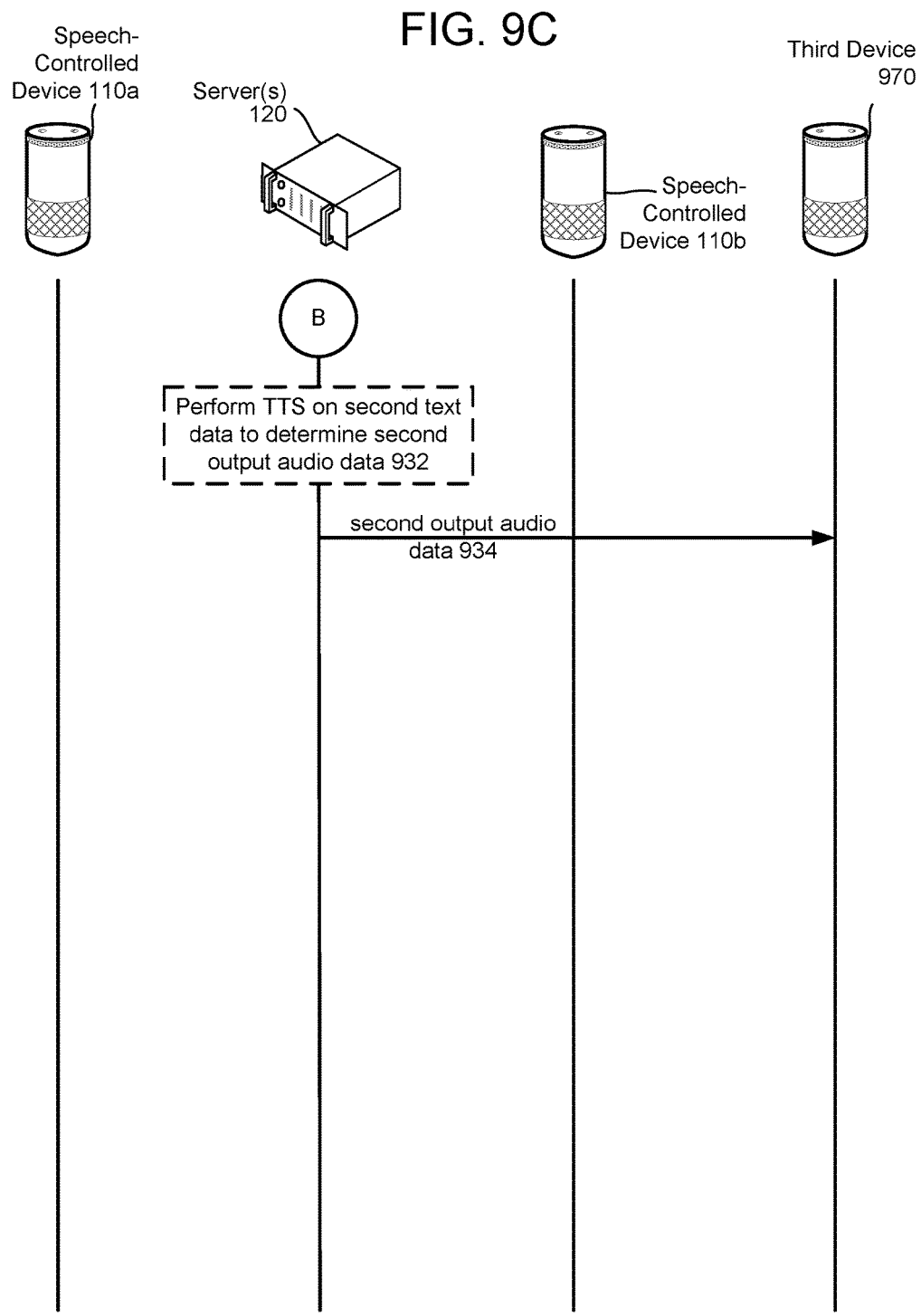

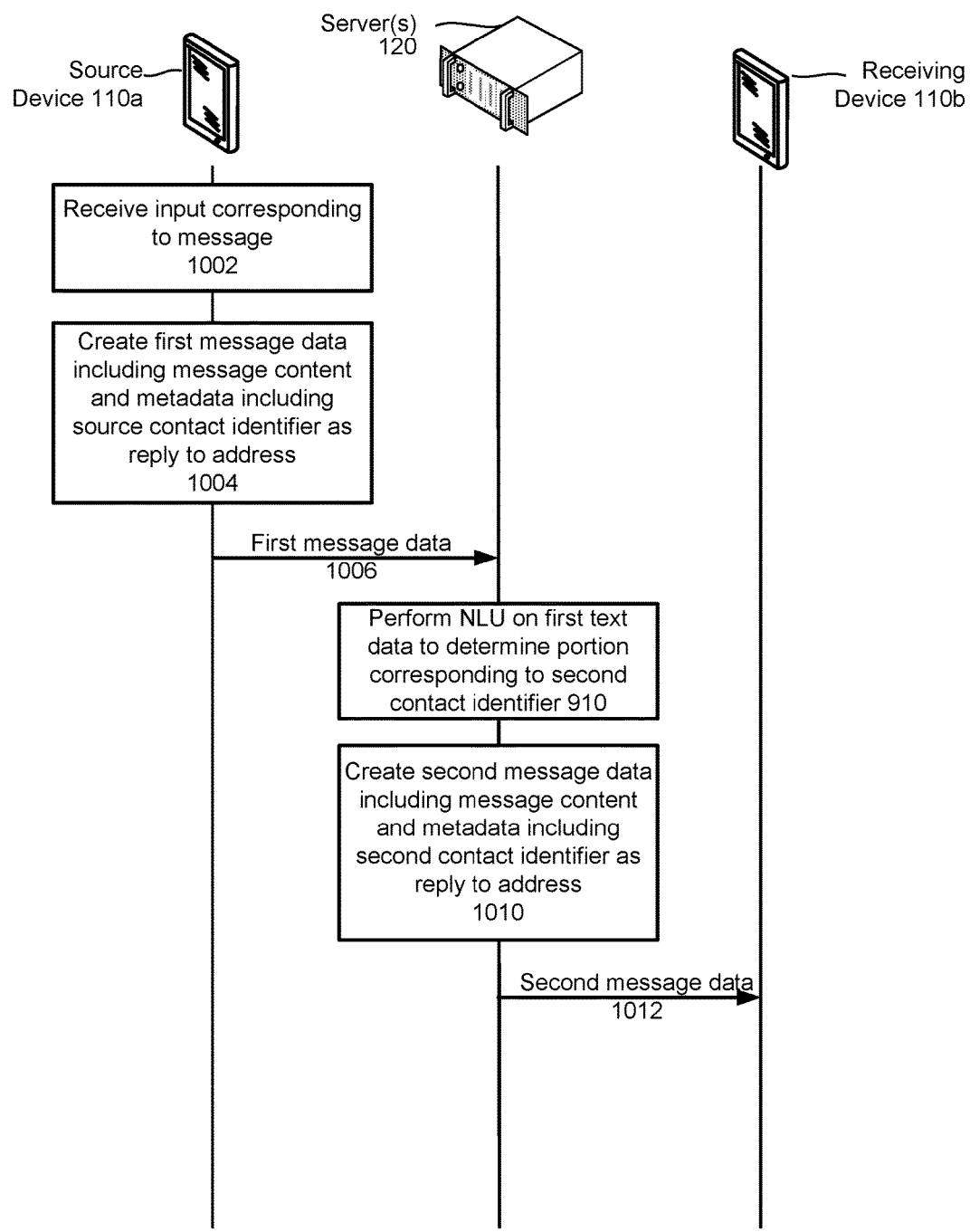

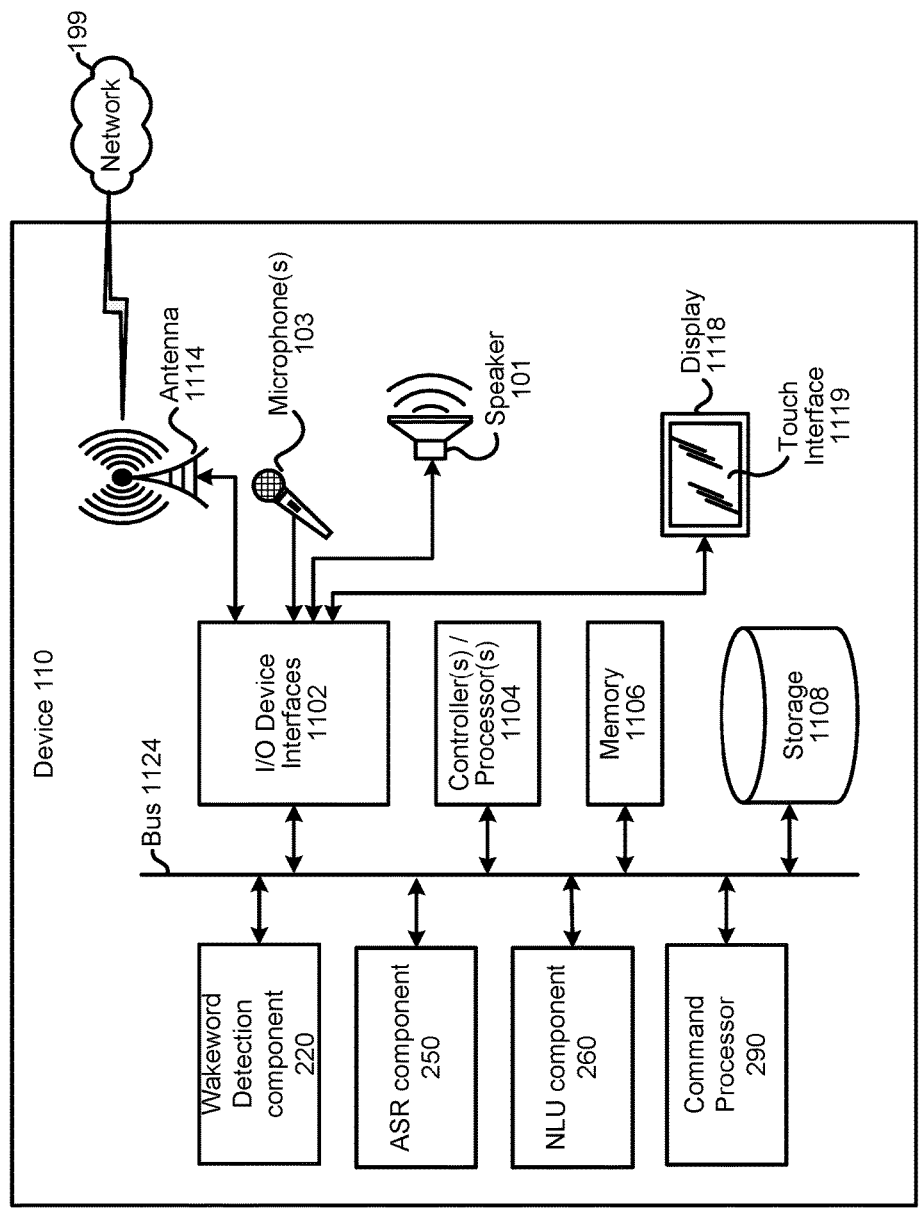

MESSAGE RESPONSE ROUTING

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for establishing escalating voice-based interactions via speech-controlled devices.

FIG. 7A-7B illustrate examples of signaling to end a communication session according to examples of the present disclosure.

FIGS. 9A-9C are a signal flow diagram illustrating escalations of voice-based interaction via speech-controlled devices.

FIG. 10 illustrates routing messages according to embodiments of the present disclosure.

FIG. 11 is a block diagram conceptually illustrating example components of speech-controlled devices according to embodiments of the present disclosure.

DETAILED DESCRIPTION

Figure 2:
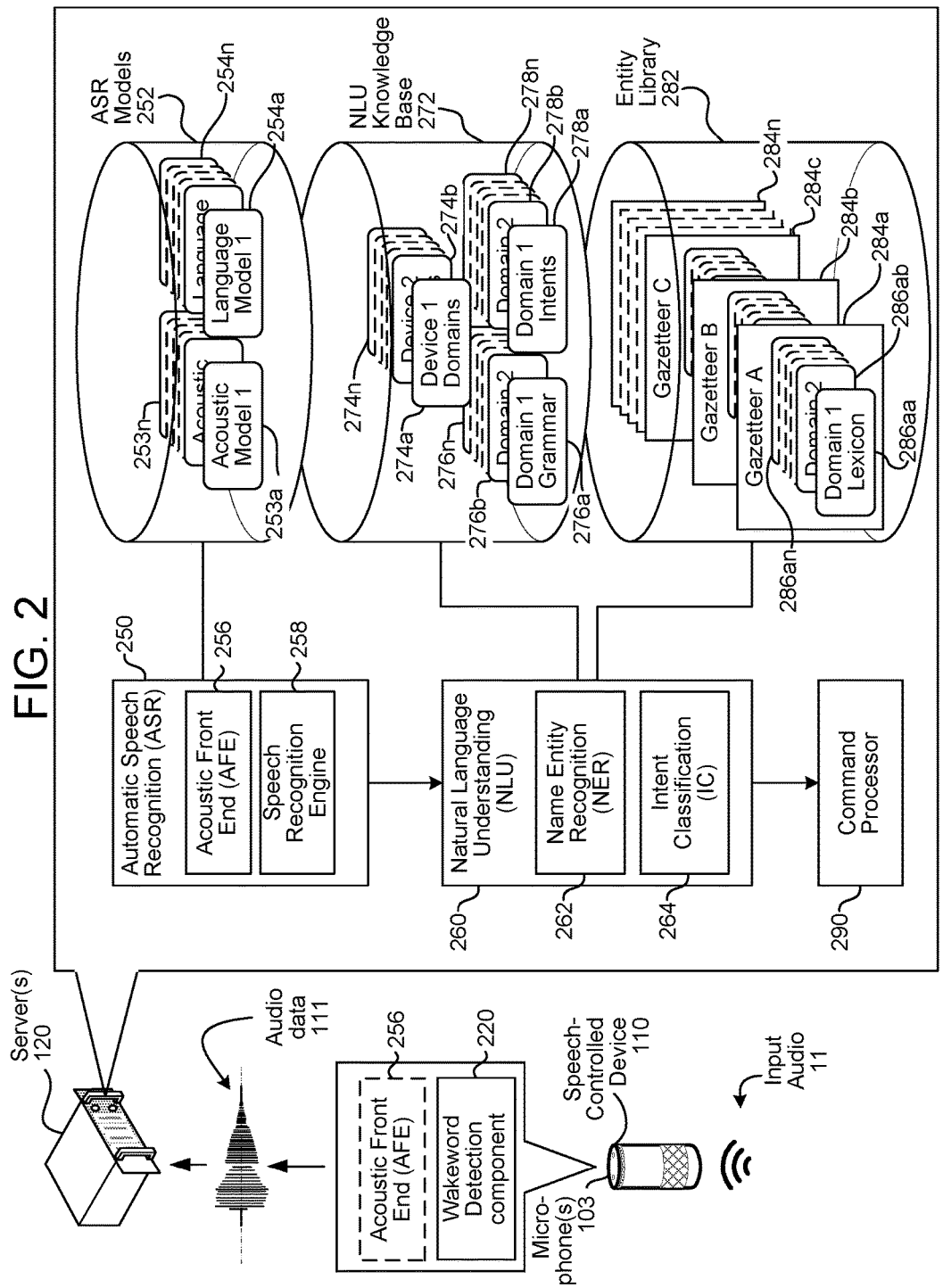
FIG. 2 is a conceptual diagram of a speech processing system.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local or other type of user device having one or more microphones being configured to capture sounds from a user speaking and convert those sounds into an audio signal. The audio signal may then be sent to a remote system for further processing by one or more remote devices, such as determining a command represented in the audio signal. The command may then be executed by a combination of remote and user devices depending on the command itself.

In certain configurations, a speech processing system may be configured to communicate messages between devices. Those message may originate as text messages or may originate as spoken messages. That is, a first device may capture an utterance or receive a text message requesting the system to send a message to a recipient, where the recipient is associated with a second device. The system may then send audio and/or text data corresponding to the message to the second device for presentation. In response, the user of the second device may speak an utterance and/or interact with a graphical user interface (GUI) of the second device. The second device can then send a response message to the system for processing and eventual delivery back to the user of the first device. In this manner a speech controlled system may facilitate exchanging (spoken and/or typed) messaging between devices.

In certain instances, a message from a first user to a second user may include a specified contact identifier for the first user so that the second user knows how to contact the first user. For example, the first user may send a message intended for a second user stating, "please call me back at 555-1212," where the message does not originate from a device, user profile or anything else associated with "555-1212." Thus, in some examples, a first device may capture an utterance including a message to be sent to a second device associated with a message recipient, wherein the first device is identified by a unique identifier (e.g., phone number, IP address, email address username, etc.) and the second device is identified by another unique identifier that is different from the unique identifier of the first device. The utterance captured by the first device may include information corresponding to another unique identifier that is also different from the unique identifier that the first device is identified by (e.g., the specified contact identifier). Once the message is sent to the second device, the recipient may desire to reply to the message (or to open a call with the sender) using the unique identifier included in the first utterance.

However, if the recipient commanded the system to reply to the original message by communicating with the unique identifier associated with the message's metadata as opposed to content (e.g., "call Jane back at the phone she called me from"), the system may route the reply using a previously existing contact identifier (e.g., the unique identifier of the first device), and not the unique identifier represented in the utterance.

Returning to the above example where the first user (e.g., "Jane") sends a message to a second user to "please call me back at 555-1212," if the second device user utters a command to return the first user's call (e.g., "call Jane back"), the system may attempt to place a call directed to the phone number associated with the first device, and not the phone number provided in the message. Therefore, the call will not be returned to the correct phone number as desired by the first user. This example presents a difficulty in speech processing systems and results in undesired system performance.

Offered is a system that can identify when contact information is included in a message, can identify a contact identifier associated with the message, and store a link between the new contact information and the sender in some manner associated with the recipient (for example with a contact entry of the sender in the recipient's contact list). Thus, when the recipient indicates a reply to be sent to the original sender, the system may route the reply using the specified contact identifier.

The system can use a natural language understanding (NLU) component to determine when an incoming message (received via voice, text or other medium) includes a request to contact the sender at a particular location or using a particular number. The system can then update contact information for the sender, for example with a recipient's contact list, with a communication domain, or with other components. The system can also create metadata associated with the message and/or sender for purposes of routing messages. For example, a first user may send a message to a second user of "call me at my office." The system may process the message text to determine the message includes an instruction to contact the sender at her office. The system may determine, using a user profile, contact list, etc. a contact identifier associated with the first user's office. The system can then associate that contact identifier with a contact list of the recipient so that when the second user attempts to call the first user (for example by speaking "call [first user]") the system routes the call to the first user's office.

FIG. 1 shows a system 100 configured to capture contact information in messages exchanged between speech-controlled devices 110a, 110b, although the messages may also be exchanged between touch-controlled devices in certain aspects. Although FIG. 1, and other figures/discussion illustrate the operation of the system 100 in a particular order, the steps described may be performed in a different order (as well as certain steps removed or added) without departing from the intent of the disclosure. As shown in FIG. 1, the system 100 may include one or more speech-controlled devices 110a and 110b local to a user 5 and a recipient 7, respectively. The system 100 may also include one or more networks 199 and one or more servers 120 connected to the speech-controlled devices 110a and 110b across network(s) 199. The server(s) 120 (which may be one or more different physical devices) may be capable of performing traditional speech processing (such as ASR, NLU, query parsing, etc.) as described herein. A single server 120 may be capable of performing all speech processing or multiple servers may combine to perform the speech processing. Further, the server(s) 120 may be configured to execute certain commands, such as answering queries spoken by the sender 5 and/or recipient 7. In addition, certain speech detection or command execution functions may be performed by the speech-controlled devices 110a and 110b.

As shown in FIG. 1, a sending user 5 may speak an utterance (represented by input audio 11). The input audio 11 may be captured by one or more microphones 103a of the device 110a and/or a microphone array (not illustrated) separated from the device 110a. The microphone array may be connected to the device 110a such that when the input audio 11 is received by the microphone array, the microphone array sends audio data corresponding to the input audio 11 to the speech-controlled device 110a. Alternatively, the microphone array may be connected to a companion application of a mobile computing device, such as a smart phone, tablet, etc. In this example, when the microphone array captures the input audio 11, the microphone array sends audio data corresponding to the input audio 11 to the companion application, which forwards the audio data to the speech-controlled device 110a. If the speech-controlled device 110a captures the input audio 11, the speech-controlled device 110a may convert the input audio 11 into audio data and send the audio data to the server(s) 120. Alternatively, if the speech-controlled device 110a receives audio data corresponding to the input audio 11 from the microphone array or companion application, the device 110a may simply forward the received audio data to the server(s) 120.

The user 5 may be referred to as a message source and/or sender 5 and the input audio 11 may correspond to the message intended for the recipient 7. The speech-controlled devices 110a, 110b may be referred to as one of multiple devices in which a message (e.g., text, voice, data, or otherwise) may be sent to or from, according to example embodiments described herein. For example, a message may be sent from a first device 110a associated with the message source (user 5) to a second device 110b associated with a message recipient (user 7) where the message includes specified contact information corresponding to a third device (not shown). Further, the descriptor "first, second, third," etc. are intended to differentiate items from each other and do not imply any particular order, and indeed may be used with in different manners with different configuration examples as shown below.

The server(s) 120 may communicate messages between speech-controlled devices 110a, 110b. For example, the system may receive audio data, which may include command information (e.g., "send a message," recipient information (e.g., "to John") and message content (e.g., "and tell him to call me at my mom's house."). The system may process the audio data to determine the command to send a message and may send a message as indicated in the command.

As shown in FIG. 1, the system may determine (150) first text data corresponding to a first message intended for a recipient. The first message may originate with a first device (having a first contact identifier) associated with a message source, for example sender 5. The first text data may be determined after performing speech processing on a spoken message originating from sender 5 (such as a spoken utterance message, voicemail, or the like) or may be determined from a written message originating from sender 5 (such as an email, text message sent using device 110c, or the like). The system may determine (152) that the first text data comprises a first portion corresponding to a second contact identifier that is different from the first contact identifier. Determining that the first text data includes a second contact identifier may include performing natural language understanding (NLU) processing on the first text data to process the original message and determine that contact information is included in the message. Further in this example embodiment, the system may perform (154) text-to-speech (TTS) processing on the first text data to determine output audio data (154) corresponding to the first text data (e.g., output audio including synthesized speech of the message content). Alternatively, the system may bypass the TTS processing step and simply route a representation of the spoken message directly to the recipient as audio data to be output from speakers connected to the second device 110b. Thus the output audio data may be in the voice of the original sending user. The system may then send (156) the output audio data to a second device (e.g., device 110b) associated with the recipient 7 of the message. The first device 110b may process the output audio data to generate output audio 15 from audio speakers 101b in communication with the second device 110b. A recipient 7 user associated with or within proximity of the second device 110b may hear the output audio 15 and may prepare a response to reply to the output audio 15 heard from speaker 101b of the second device 110b. The response in reply to the output audio 15 may be a reply message uttered by the recipient 7 detected by the microphones(s) 103b of the second device 110b.

The second device may receive input audio corresponding to an utterance from the recipient 7 to send the reply message and may convert that audio into input audio data. The server(s) 120 may then receive (158) the input audio data corresponding to the reply. The server(s) 120 may then perform (160) automatic speech recognition (ASR) processing on the input audio data to determine ASR result data, e.g., second text data. The server(s) 120 may then perform (162) natural language understanding (NLU) processing on the second text data to determine that the utterance includes a command to send a new message to the message source/sender 5. The second text data may include instructions by the speaker of the utterance (e.g., recipient 7) to send the new message using the second contact identifier or the utterance may simply indicate that the new message is intended for the original message source/sender 5. The system may then determine (164) that the original message source (i.e., sender 5 or recipient of the new message from recipient 7) is associated with the second contact identifier and may then send (166) message data (which may include the second text data or TTS data associated with the second text data) to a third device (not illustrated) associated with the second contact identifier. More than one device may be associated with the original message source and the message source may send a message instructing the recipient to contact the message source on another device that is not the device used to receive and send the message to the recipient. For example, a first device (i.e., home office Echo) and a second device (i.e., kitchen Echo) may be associated with the sender 5 or message source of the message. The sender 5 (i.e. Mike) may speak an utterance to the first device (home office Echo) saying "tell John to call me on my kitchen Echo" as a message to be sent to John. John may receive the message on a device that is associated with John and may respond to the message by speaking an utterance saying "call Mike on his kitchen Echo," which results in a voice call being placed between Mike's device and John's device in John's kitchen.

As noted above, the first text data associated with the original message may be received from a text-based message or from a speech-based message. In the latter example, the system may further include performing ASR processing on audio data from the speech-based message to obtain text and performing NLU processing on the resulting text to identify the message intended for the recipient, where the message includes the contact identifier.

The message including audio data may be a voicemail message uttered by the message source (i.e., sender 5) in response to a first user (i.e., recipient 7) not being available to receive a call. The message may be stored in a memory that is in accessible by a device associated with the recipient 7. A method may further include determining that the first contact identifier is one of a plurality of contact identifiers associated with the message source, the first contact identifier being one of a first telephone number, a first e-mail address, or a first web-service address. The contact identifier may include at least one of a second telephone number, a second e-mail address, or a second web-service address. The method may further include determining, for example using NLU processing, that the original message comprises an instruction to contact the message source using the contact identifier. The method may further include associating (at least temporarily) the contact identifier with the message source (for example in a contact list of the recipient). Further details of the system 100 configured to capture contact information in a message are explained below, following a discussion of the overall speech processing system of FIG. 2. The system 100 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199 (not shown). An audio capture component, such as the microphone 103 of the speech-controlled device 110 (or other device), captures input audio 11 corresponding to a spoken utterance. The speech-controlled device 110, using a wakeword detection component 220, then processes audio data corresponding to the input audio 11 to determine if a keyword (such as a wakeword) is detected in the audio data. Following detection of a wakeword, the speech-controlled device 110 sends audio data 111, corresponding to the utterance, to a server 120 that includes an ASR component 250. The audio data 111 may be output from an acoustic front end (AFE) 256 located on the speech-controlled device 110 prior to transmission, or the audio data 111 may be in a different form for processing by a remote AFE 256, such as the AFE 256 located with the ASR component 250.

The wakeword detection component 220 works in conjunction with other components of the speech-controlled device 110, for example the microphone 103, to detect keywords in audio data corresponding to the input audio 11. For example, the speech-controlled device 110 may convert input audio 11 into audio data 111, and process the audio data 111 using the wakeword detection component 220 to determine whether speech is detected, and if so, if the audio data 111 comprising speech matches an audio signature and/or model corresponding to a particular keyword or phrase.

The speech-controlled device 110 may use various techniques to determine whether audio data 111 includes speech. Some embodiments may apply voice activity detection (VAD) techniques. Such techniques may determine whether speech is present in input audio 11 based on various quantitative aspects of the input audio 11, such as a spectral slope between one or more frames of the input audio; energy levels of the input audio 11 in one or more spectral bands; signal-to-noise ratios of the input audio 11 in one or more spectral bands; or other quantitative aspects. In other embodiments, the speech-controlled device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the input audio to one or more acoustic models in speech storage, which acoustic models may include models corresponding to speech, noise (such as environmental noise or background noise), or silence. Still other techniques may be used to determine whether speech is present in the input audio 11.

Once speech is detected in the input audio 11, the speech-controlled device 110 may use the wakeword detection component 220 to perform wakeword detection to determine when a user intends to speak a command to the speech-controlled device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data 111) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data 111 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword detection builds HMMs for each wakeword and non-wakeword speech signal respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN)-HMM decoding framework. In another embodiment the wakeword detection system may be built on DNN/recursive neural network (RNN) structures directly, without MINI involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the speech-controlled device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data 111 corresponding to the wakeword may be removed by the speech-controlled device 110 prior to sending the audio data 111 to the server(s) 120.

Upon receipt by the server(s) 120, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text recognized in the audio data 111. The ASR component 250 may also output multiple hypotheses in the form of a lattice or an N-best list with each hypothesis corresponding to a confidence score or other score (e.g., such as probability scores, etc.).

The device or devices (e.g., the server(s) 120) including the ASR component 250 may include an acoustic front end (AFE) 256 and a speech recognition engine 258. The AFE 256 transforms the audio data 111 into speech recognition data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-controlled device 110 may process audio data 111 into feature vectors (e.g., using an on-device AFE 256) and transmit the feature vector data to the server(s) 120 across the network(s) 199 for ASR processing. Feature vector data may arrive at the server(s) 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output speech results that make sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, the server 120, or another device (e.g., a server running a search engine, etc.).

The device performing NLU processing (e.g., the server 120) may include various components, including potentially dedicated processor(s), memory, storage, etc. The device performing NLU processing may include a dedicated NLU component/component 260, which may include a name entity recognition (NER) component 262 and intent classification (IC) component 264. The device performing NLU processing may additionally include NLU storage 273 and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways.

The NLU component 260 receives text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-controlled device 110, the server(s) 120, an application server 125, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of input speech, the NLU component 260 may be configured to determine a "domain" of the speech so as to determine and narrow down which services offered by an endpoint device (e.g., the server(s) 120, the speech-controlled device(s) 110, an application server(s) 125, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from a contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-controlled device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", communications, etc. Each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result. This is described further in detail below in reference to FIG. 3.

An IC component 264 parses the utterance to determine an intent(s) for each identified domain, where the intent(s)

corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-controlled device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text data, commands, etc., may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may be a music playing application, such as one located on the speech-controlled device 110 or in a music playing appliance configured to execute a music playing command. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Figure 3:
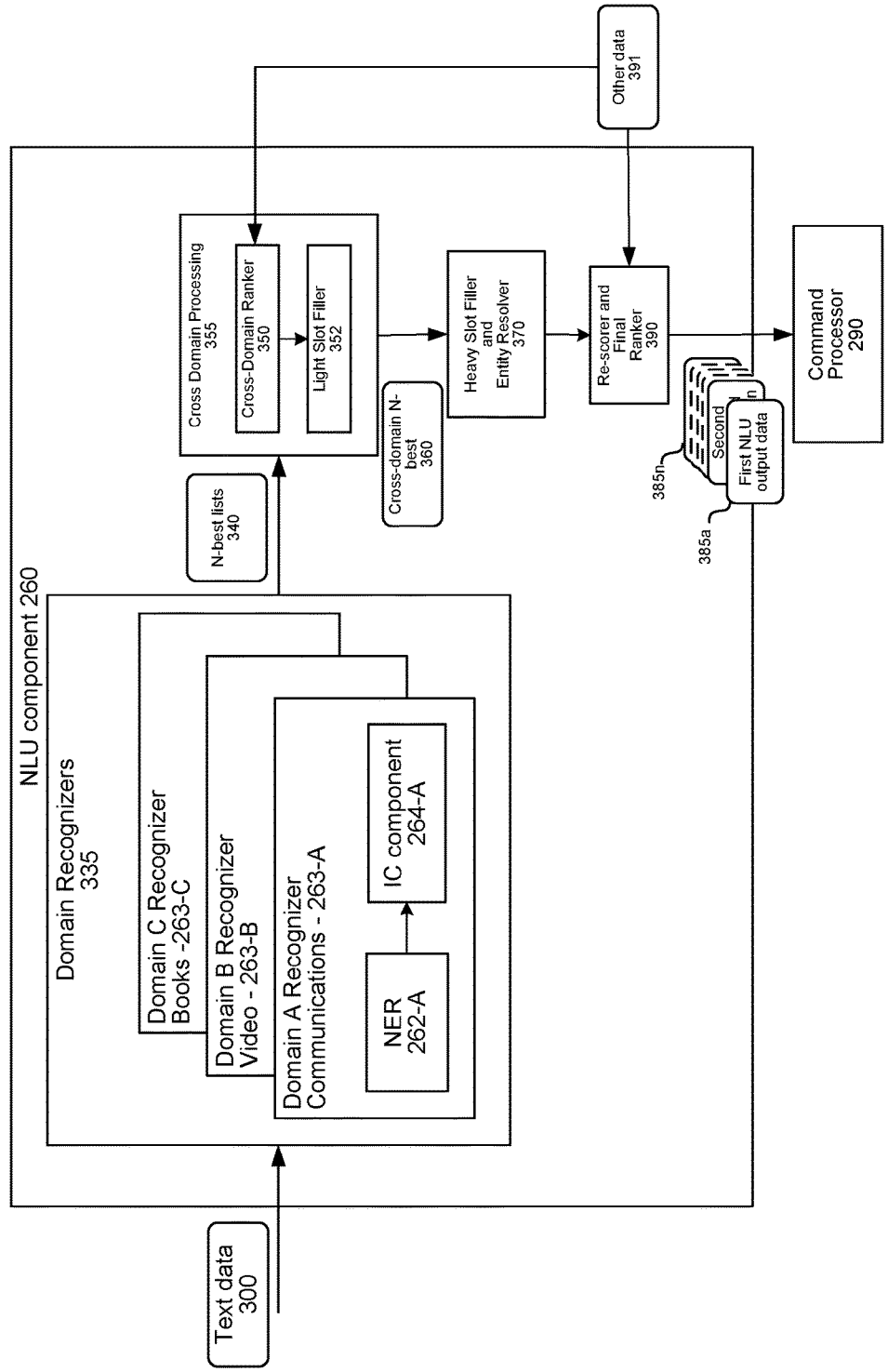
FIG. 3 is a conceptual diagram of a system architecture for parsing incoming utterances using multiple domains according to embodiments of the present disclosure.

The NLU operations of the system 100 may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to the NLU component 260 during runtime operations where NLU operations are performed on text data (such as text data output from the ASR component 250). Each domain may have specially configured components to perform various steps of the NLU operations.

For example, the system 100 may include a multi-domain architecture consisting of multiple domains for intents/commands executable by the system 100 (or by other devices connected to the system 100), such as music, video, books, and information. The system 100 may include a plurality of domain recognizers 335, where each domain may include its own recognizer 263. Each recognizer may include various NLU components such as an NER component 262, IC component 264 and other components such as an entity resolver, or other components.

For example, a music domain recognizer 263-A (Domain A) may have an NER component 262-A that identifies what slots (i.e., portions of input text data 300) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to an entity as well as identify what type of entity corresponds to the text data portion. For example, for the text "play songs by the stones," an NER 262-A trained for a music domain may recognize the portion of text [the stones] corresponds to an entity and an artist name. The music domain recognizer 263-A may also have its own intent classification (IC) component 264-A that determines the intent of the text assuming that the text is within the proscribed domain. An IC component 264 may use a model, such as a domain specific maximum entropy classifier to identify the intent of the text, where the intent is the action the user desires the system 100 to perform.

As illustrated in FIG. 3, multiple domains may operate substantially in parallel, with different domain specific components. That is, domain B for video may have its own recognizer 263-B including NER component 262-B, and IC component 264-B. Domain C for books may also have similar components in its recognizer 263-C, and so on for the different domains available to the system 100. When input text data 300 (e.g., ASR output text data) is received, the same text data that is input into the NLU pipeline for domain A 263-A may also be input into the NLU pipeline for domain B 263-B, where the components for domain B 263-B will operate on the text data as if the text data related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, 263-C, etc.). The recognizers may operate using machine learning trained models such as a CRF, maximum entropy classifier, neural network (such as a deep neural network (DNN) or recurrent neural network (RNN)), or other classifier. The recognizers 335 may also use rules that operate on input query text data in a particular form to identify named entities and/or intents. The recognizers 335 may also operate using a data structure such as a finite state transducer (FST) to process the query text data to perform NER and/or IC. Other techniques or models may also be used to perform NER and/or IC. The techniques may also be used together. For example, a set of rules, an FST, and a trained machine learning model may all operate on input text data substantially in parallel to determine the named entities/intents of an input utterance. If one technique performs its task with high enough confidence, the system 100 may use the output of that technique over the others. The system 100 may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the input text data.

The output of each recognizer 335 is a N-best list 340 of intents and identified slots representing the particular recognizer's top choices as to the meaning of the input text data, along with scores for each item in the N-best list 340. For example, for input text data 300 of "send a message to mom," the communications recognizer 263-A may output an N-best list 340 in the form of:

[0.95] SendMessageIntent Recipient: Mom
[0.02] OpenCallIntent Callee: Mom where the NER component 262-A of the recognizer 263-A has determined that for different items in the N-best list 340, the word "mom" corresponds to a slot. (Though different items in the N-best list 340 interpret those slots differently, for example labeling "mom" as a message recipient in one choice but labeling it as a callee in another.) The IC component 264-A of the recognizer 263-A has also determined that the intent of the input text data 300 is a SendMessageIntent in one instance but an OpenCallIntent in another. The recognizer 263-A also determined a score for each item on the list representing the recognizer's confidence that the particular item is correct. As can be seen in the example, the top item has the highest score. Each recognizer of the recognizers 335 may operate on the input text data 300 substantially in parallel, resulting in a number of different N-best lists 340, one for each domain (e.g., one N-best 340 list for music, one N-best list 340 for video, etc.). The size of any particular N-best list 340 output from a particular recognizer is configurable and may be different across domains.

While the recognizers 335 perform NER, that is they may identify words of the input text data 300 that are important for downstream processing (sometimes called light slot filling), and may even label those words according to type (such as artist name, album name, city, or the like), the recognizers 335 may not perform entity resolution (i.e., determining the actual entity corresponding to the words of the input text data 300). Entity resolution is typically a higher latency process and involves communications with a knowledge base 272 or other component to precisely identify the specific entities. As this process is resource intensive, it may be preferable to not perform this task for each item of every N-best list 340 across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to a cross domain processing component 355 which may then further rank the individual items on the N-best lists 340 as well as perform other operations.

The cross domain processing component 355 may include a cross-domain ranker 350. The cross-domain ranker 350 takes the group of N-best lists 340 and selects from among the lists 340 the top choices to create a new N-best list 360 that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list 360 created by the cross-domain ranker 350, take the example input text data 300 of "play the hunger games." The text data 300 may be processed by each of the recognizers 335, and each will output an N-best list 340, resulting in a group of N-best lists 340 input into the cross domain processing component 355. The cross-domain ranker 350 may then rank the individual items among the N-best lists 340 to create a new N-best list 360. For example, the cross-domain ranker 350 may output an N-best list 360 in the form of:

[0.78] Video PlayVideoIntent VideoName: The Hunger Games

[0.13] Books ReadBookIntent BookName: The Hunger Games

[0.07] Communications SendMessageIntent Recipient: Hunger Games where the top items from different N-best lists 340 from multiple domains are grouped into a single N-best list 360. As shown, the top scoring item is from the video domain 263-B, which includes the intent "playvideointent" and a slot labeled as video name corresponding to the text "the hunger games." The next item is from the books domain 263-C, and includes the intent "readbookintent" and a slot labeled as book name corresponding to the text "the hunger games." Each item in the N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. The light slot filler 352 can take information from slots and alter it to make the data more easily processed by downstream components. The operations of the light slot filler 352 are typically low latency operations that do not involve heavy operations such as reference to a knowledge base. The purpose of the light slot filler 352 is to replace words with other words or values that may be more easily understood by downstream components. For example, if input text data 300 included the word "tomorrow", the light slot filler 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. The heavy slot filler and entity resolver 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text data 300. Specific intent/slot combinations may also be tied to a particular source, which may then be used to resolve the text (such as by providing information or a command to be executed in response to a user query). For example, in the example "play songs by the stones," the resolver 370 may reference to a personal music catalog, Amazon Music account, user profile, or the like. The output from the entity resolution component 370 may include an altered N-best list that is based on the cross-domain N-best list 360 but also includes more detailed information about the specific entities mentioned in the text data 300 (such as specific entity IDs) and/or more detailed slot data that can eventually be used by a command processor 290 which may be incorporated into the same system components or pipeline or may be on a separate device in communication with the system 100. While illustrated as a cross-domain resolver, multiple resolution components 370 may exist where a particular resolution component 370 may be specific for one or more domains.

As can be appreciated, the entity resolver 370 may not necessarily be successful in resolving every entity and filling every slot. This may result in incomplete results in the combined N-best list 360. A re-scorer and final ranker component 390 may consider such errors when determining how to rank the ultimate results for potential execution. For example, if an item of the N-best list 360 comes from a book domain and includes a read book intent, but the entity resolver 370 cannot find a book with a title matching the input text data 300, that particular result may be re-scored by the final ranker 390 to be given a lower score. Each item considered by the final ranker 390 may also be assigned a particular confidence, where the confidence may be determined by a recognizer 335, cross domain processor 355, or by the final ranker 390 itself. Those confidence scores may be used to determine how to rank the individual NLU results represented in the N-best lists 340. The confidence scores may be affected by unfilled slots. For example, if one domain is capable of filling a slot (i.e., resolving the word in the slot to an entity or other recognizable form) for an input query, the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists 340, but may also consider other data 391. This other data 391 may include a variety of information. For example, the other data 391 may include application rating or popularity. For example, if one application has a particularly high rating, the system 100 may increase the score of results associated with that particular application. The other data 391 may also include information about applications that have been specifically enabled by the user (as indicated in a user profile). NLU results from enabled applications may be scored higher than results from non-enabled applications. User history may also be considered, such as if the user regularly uses a particular supplemental application or does so at particular times of day. Date, time, location, weather, type of device 110, customer ID, context, and other information may also be considered. For example, the system 100 may consider when any particular applications are currently active (such as music being played, a game being played, etc.) between the system 100 and speech-controlled device 110. The highest scoring result (or results in the case of multiple commands being in an utterance) may be passed to a downstream command processor 290 for execution.

Following final ranking, the NLU component 260 may output NLU output data 385. The NLU output data 385 may include an indicator of the command to be executed along with data associated with the command, for example an indication that the command is "play music" and the music to be played is "Adele." The NLU output data 385 may be in the form of previous NLU data such as item(s) in N-best list 340, item(s) in cross-domain N-best list 360, or the like. The NLU output data 385 may also be in a format executable by the command processor 290. Multiple instances of NLU output data (e.g., 385a-385n) may be output.

Figure 4:
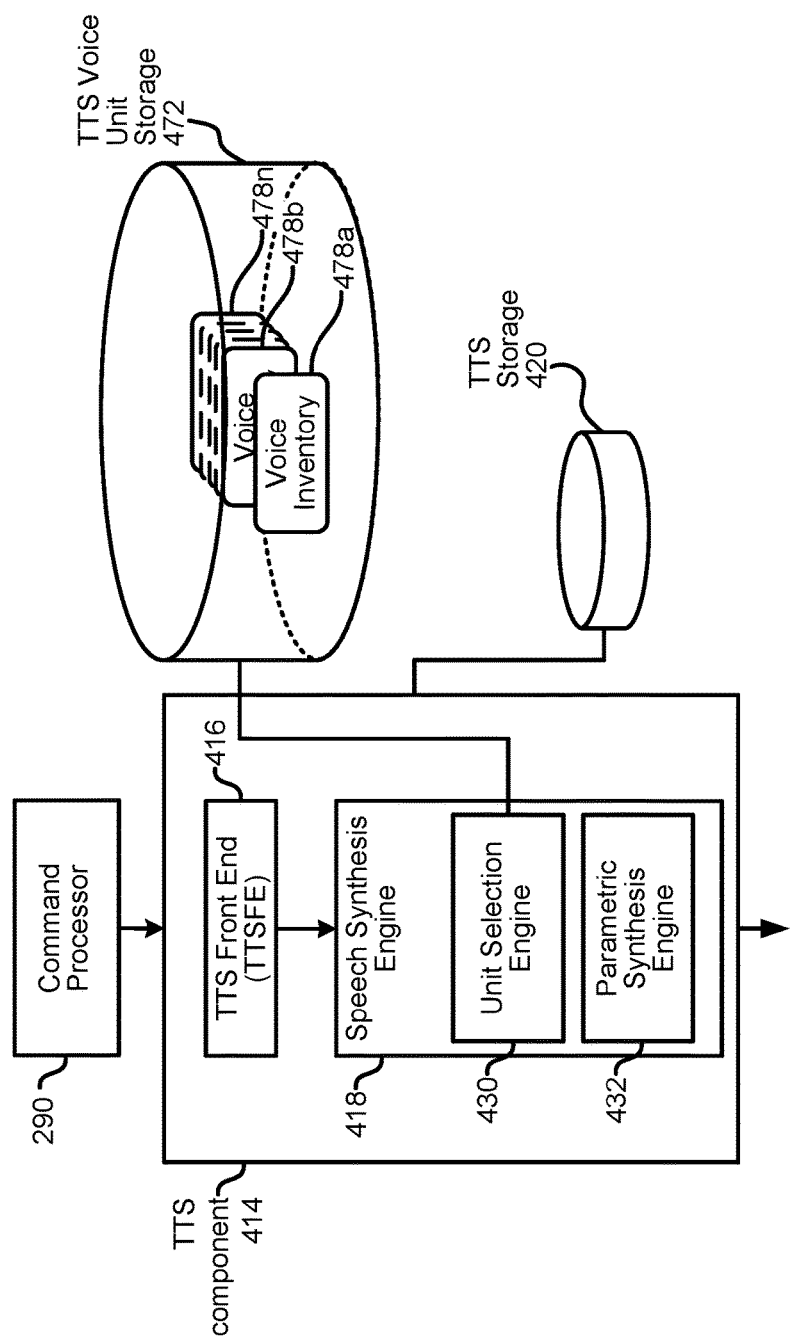
FIG. 4 is a conceptual diagram of how text-to-speech processing is performed according to embodiments of the present disclosure.

As illustrated in FIG. 4, a TTS component 414 may receive tagged text data from the command processor 290, so the TTS component 414 may synthesize speech corresponding to the text data. Speech may be synthesized by the TTS component 414 as described below with respect to FIG. 4.

The TTS component 414 includes a TTS front end (TTSFE) 416, a speech synthesis engine 418, and a TTS storage 420. The TTSFE 416 transforms input text data (e.g., from the command processor 290) into a symbolic linguistic representation for processing by the speech synthesis engine 418. The TTSFE 416 may also process tags or other data input to the TTS component 414 that indicate how specific words should be pronounced. The speech synthesis engine 418 compares the annotated phonetic units and information stored in the TTS storage 420 for converting the input text data into speech (i.e., audio data). The TTSFE 416 and the speech synthesis engine 418 may include their own controller(s)/processor(s) and memory, or they may use the controller/processor and memory of the server(s) 120, the speech-controlled device 110, or another device, for example. Similarly, the instructions for operating the TTSFE 416 and the speech synthesis engine 418 may be located within the TTS component 414, within the memory and/or storage of the server(s) 120, the speech-controlled device 110, or within an external device.

Text data input into the TTS component 414 may be sent to the TTSFE 416 for processing. The TTSFE 416 may include components for performing text normalization, linguistic analysis, and linguistic prosody generation. During text normalization, the TTSFE 416 processes the input text data and generates standard/normalized text data, converting such things as numbers, abbreviations (e.g., Apt., St., etc.), and symbols ($, %, etc.) into the equivalent of written out words.

During linguistic analysis, the TTSFE 416 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 414 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 420. The linguistic analysis performed by the TTSFE 416 may also identify different grammatical components such as prefixes, suffixes, phrases, punctuation, syntactic boundaries, or the like. Such grammatical components may be used by the TTS component 414 to craft a natural sounding audio waveform output. The language dictionary may also include letter-to-sound rules and other tools that may be used to pronounce previously unidentified words or letter combinations that may be encountered by the TTS component 414. Generally, the more information included in the language dictionary, the higher quality the speech output.

Based on the linguistic analysis, the TTSFE 416 may then perform linguistic prosody generation where the phonetic units are annotated with desired prosodic characteristics, also called acoustic features, which indicate how the desired phonetic units are to be pronounced in the eventual output speech. During this stage, the TTSFE 416 may consider and incorporate any prosodic annotations that accompanied the text data input to the TTS component 414. Such acoustic features may include pitch, energy, duration, and the like. Application of acoustic features may be based on prosodic models available to the TTS component 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 416, referred to as a symbolic linguistic representation, may include a sequence of phonetic units annotated with prosodic characteristics. This symbolic linguistic representation may be sent to the speech synthesis engine 418, also known as a synthesizer, for conversion into an audio waveform of speech for output to an audio output device and eventually to a user. The speech synthesis engine 418 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 418 may perform speech synthesis using one or more different methods. In one method of synthesis called unit selection, a unit selection engine 430 matches the symbolic linguistic representation created by the TTSFE 416 against a database of recorded speech, such as a database of a voice corpus (e.g., the TTS voice unit storage 472). The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 430 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 432, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 414 may include an acoustic model, or other models, which may convert a symbolic linguistic representation into a synthetic acoustic waveform of the input text data based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 416.

The parametric synthesis engine 432 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 418, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 478 (stored in the TTS voice unit storage 472), where each unit database is configured with a different "voice." Such voice inventories may also be linked to user accounts. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio data of each customized voice corpus may match a desired speech quality. The customized voice inventory 478 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 414 may synthesize speech as normal, but the system 100, either as part of the TTS component 414 or otherwise, may apply a filter to make the synthesized speech take on the desired speech quality. In this manner a traditional TTS output may be altered to take on the desired speech quality.

During runtime the TTS component 414 may receive text data for speech synthesis along with an indicator for a desired speech quality of the output speech. The TTS component 414 may then select a voice matching the speech quality, either for unit selection or parametric synthesis, and synthesize speech using the received text data and speech quality indicator.

Figure 5:
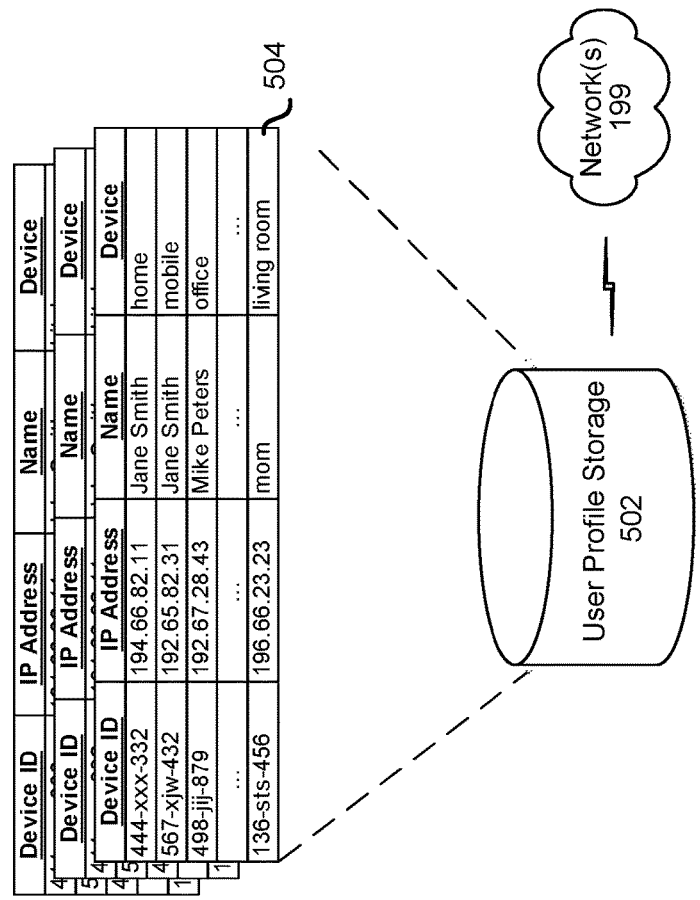
FIG. 5 illustrates data stored and associated with user profiles according to embodiments of the present disclosure.

The server 120 may also include data regarding user accounts, shown by the user profile storage 502 illustrated in FIG. 5. The user profile storage may be located proximate to server 120, or may otherwise be in communication with various components, for example over network 199. The user profile storage 502 may include a variety of information related to individual users, accounts, etc. that interact with the system 100. For illustration, as shown in FIG. 5, the user profile storage 502 may include data regarding the devices associated with particular individual user accounts 504. In an example, the user profile storage 502 is a cloud-based storage. Such data may include device identifier (ID) and internet protocol (IP) address information for different devices as well as names of users and locations of the devices.

A user of a first device may be associated with a user profile 504, wherein the user profile 504 may include a plurality of entries each corresponding to another user. For example, a first user may be associated with a first user profile, wherein the first user profile may include a contact list comprising a plurality of contacts. Each one of the plurality of contacts may include contact information pertaining to the contact. For example, a first contact may include contact information entries comprising a first name, last name, mailing address, one or more e-mail addresses, one or more phone numbers (e.g., work, home, mobile, facsimile, etc.) one or more text contact numbers, one or more web-service addresses/accounts (e.g., Facebook, Twitter, etc.), or the like. The contact information entries may also include other users associated with the first user. For example, the first user may have a contact information entry corresponding to family members (e.g., mother, father, sister, brother, son, daughter, grandmother, grandfather, aunt, uncle, niece, nephew, cousin, etc.) business associates (e.g., coworker, supervisor, assistant, client, partner, etc.) or any other entity with contact information. Each contact information entry may include respective contact information entries for each family member and/or business associate.

Thus, if a user speaks a command to the system to "call Jane" the system may access the contact list associated with the speaking user's profile and find a contact number associated with a contact "Jane" and may initiate a call with a device associated with that contact number.

FIGS. 6-8B illustrate a communication system that can be part of/be in communication with a speech-controlled system described here. The communications system may be invoked, for example, by a speech command related to a communications domain (e.g., using recognizer 263-A). The communications system may be used to engage synchronous communication between devices using various communication technologies, for example a public switched telephone network (PSTN) and/or cable television (TV) networks (e.g., via a cable provider), via wireless networks such as Public Land Mobile Network (PLMN) (e.g., cellular network) and/or via the internet using techniques such as Voice over Internet Protocol (VoIP). The communication system may also be used to exchange asynchronous message such as short message service (SMS) or other text messages, voice messages, picture messages, or the like.

Figure 6:
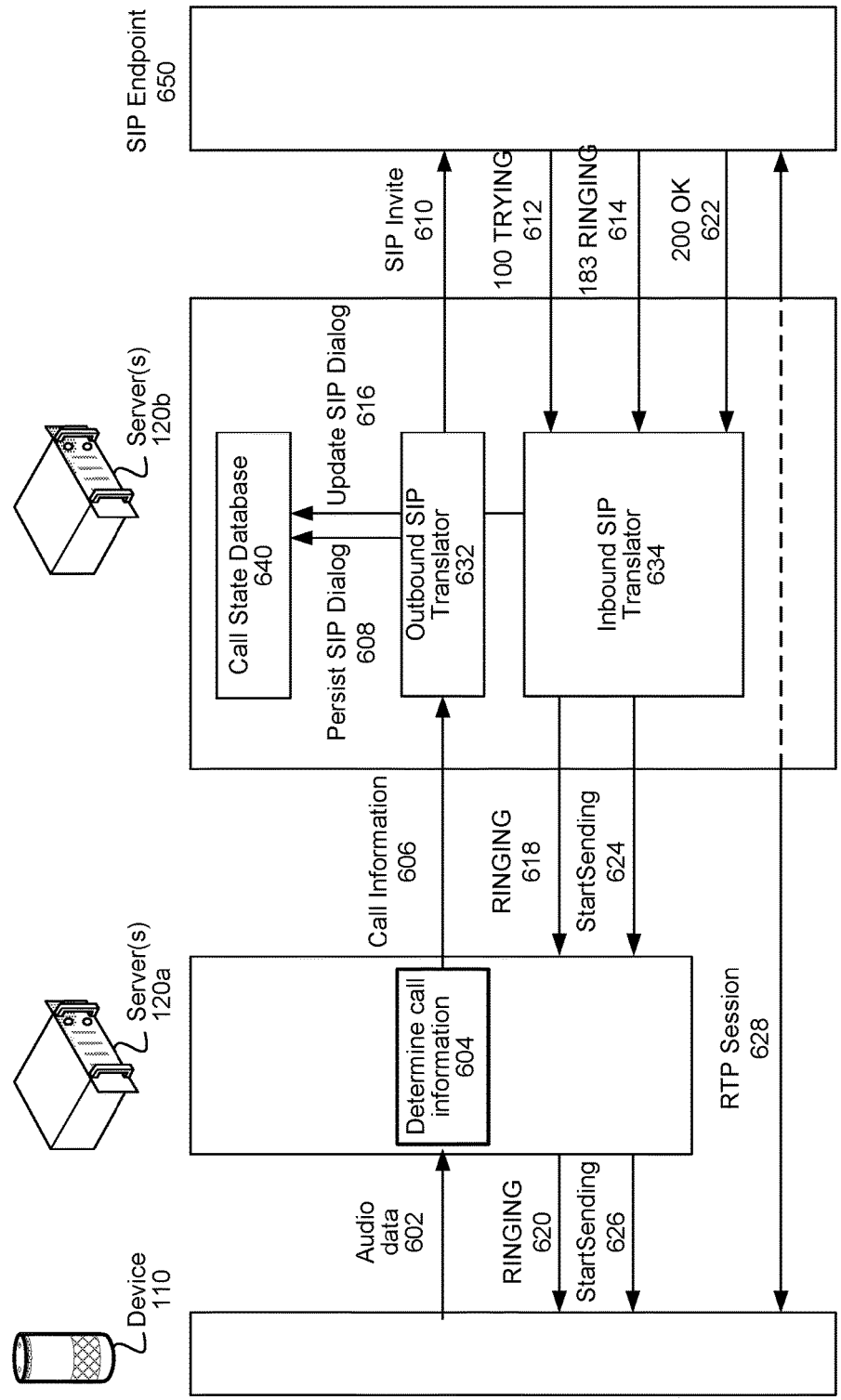
FIG. 6 illustrates an example of signaling to initiate a communication session according to examples of the present disclosure.

FIG. 6 illustrates an example of signaling to initiate a communication session according to examples of the present disclosure. In one example configuration, the server(s) 120a are configured to enable voice commands (e.g., perform ASR, NLU, etc. to identify a voice command included in audio data), whereas the server(s) 120b are configured to enable communication sessions (e.g., using session initiation protocol (SIP), exchanging short message service (SMS or other text messages, exchanging voice messages, or the like). For example, the server(s) 120b may send SIP messages to endpoints (e.g., adapter 108, device 110, remote devices, etc.) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the server(s) 120b may send SIP messages to initiate a single RTP media stream between two endpoints (e.g., direct RTP media stream between the device 110 and the adapter 108) and/or to initiate and facilitate RTP media streams between the two endpoints (e.g., RTP media streams between the device 110 and the server(s) 120b and between the server(s) 120b and the adapter 108). During a communication session, the server(s) 120b may initiate two media streams, with a first media stream corresponding to incoming audio data from the device 110 to the adapter 108 and a second media stream corresponding to outgoing audio data from the adapter 108 to the device 110, although for ease of explanation this may be illustrated as a single RTP media stream.

As illustrated in FIG. 6, the device 110 may send (602) audio data to the server(s) 120a and the server(s) 120a may determine (604) call information using the audio data and may send (606) the call information to the server(s) 120b. The server(s) 120a may determine the call information by performing ASR, NLU, etc., as discussed above, and the call information may include a data source name (DSN), a number from which to call, a number to which to call, encodings and/or additional information. For example, the server(s) 120a may identify from which phone number the user would like to initiate the telephone call, to which phone number the user would like to initiate the telephone call, from which device 110 the user would like to perform the telephone call, etc. The server(s) 120a may also identify contact information as discussed herein.

The server(s) 120b may include an outbound SIP translator 632, an inbound SIP translator 634 and a call state database 640. The outbound SIP translator 632 may include logic to convert commands received from the server(s) 120a into SIP requests/responses and may handle sending outgoing SIP requests and sending responses to incoming SIP requests. After receiving the call information by the outbound SIP translator 632, the outbound SIP translator 632 may persist (608) a SIP dialog using the call state database 640. For example, the DSN may include information such as the name, location and driver associated with the call state database 640 (and, in some examples, a user identifier (ID) and password of the user) and the outbound SIP translator 632 may send a SIP dialog to the call state database 640 regarding the communication session. The call state database 640 may persist the call state if provided a device ID and one of a call ID or a dialog ID. The outbound SIP translator 632 may send (610) a SIP Invite to a SIP Endpoint 650, which may be the adapter 108, a remote device, a Session Border Controller (SBC) or the like.

The inbound SIP translator 634 may include logic to convert SIP requests/responses into commands to send to the server(s) 120a and may handle receiving incoming SIP requests and incoming SIP responses. The SIP endpoint 650 may send (612) a 100 TRYING message to the inbound SIP translator 634 and may send (614) a 183 RINGING message to the inbound SIP translator 634. The inbound SIP translator 634 may update (616) the SIP dialog using the call state database 640 and may send (618) a RINGING message to the server(s) 120a, which may send (620) the RINGING message to the device 110.

When the communication session is accepted by the SIP endpoint 650, the SIP endpoint 650 may send (622) a 200 OK message to the inbound SIP translator 634, the inbound SIP translator 645 may send (624) a startSending message to the server(s) 120a and the server(s) 120a may send (626) the startSending message to the device 110. The startSending message may include information associated with an internet protocol (IP) address, a port, encoding or the like required to initiate the communication session. Using the startSending message, the device 110 may establish (628) an RTP communication session with the SIP endpoint 650 via the server(s) 120b.

Figure 7A:
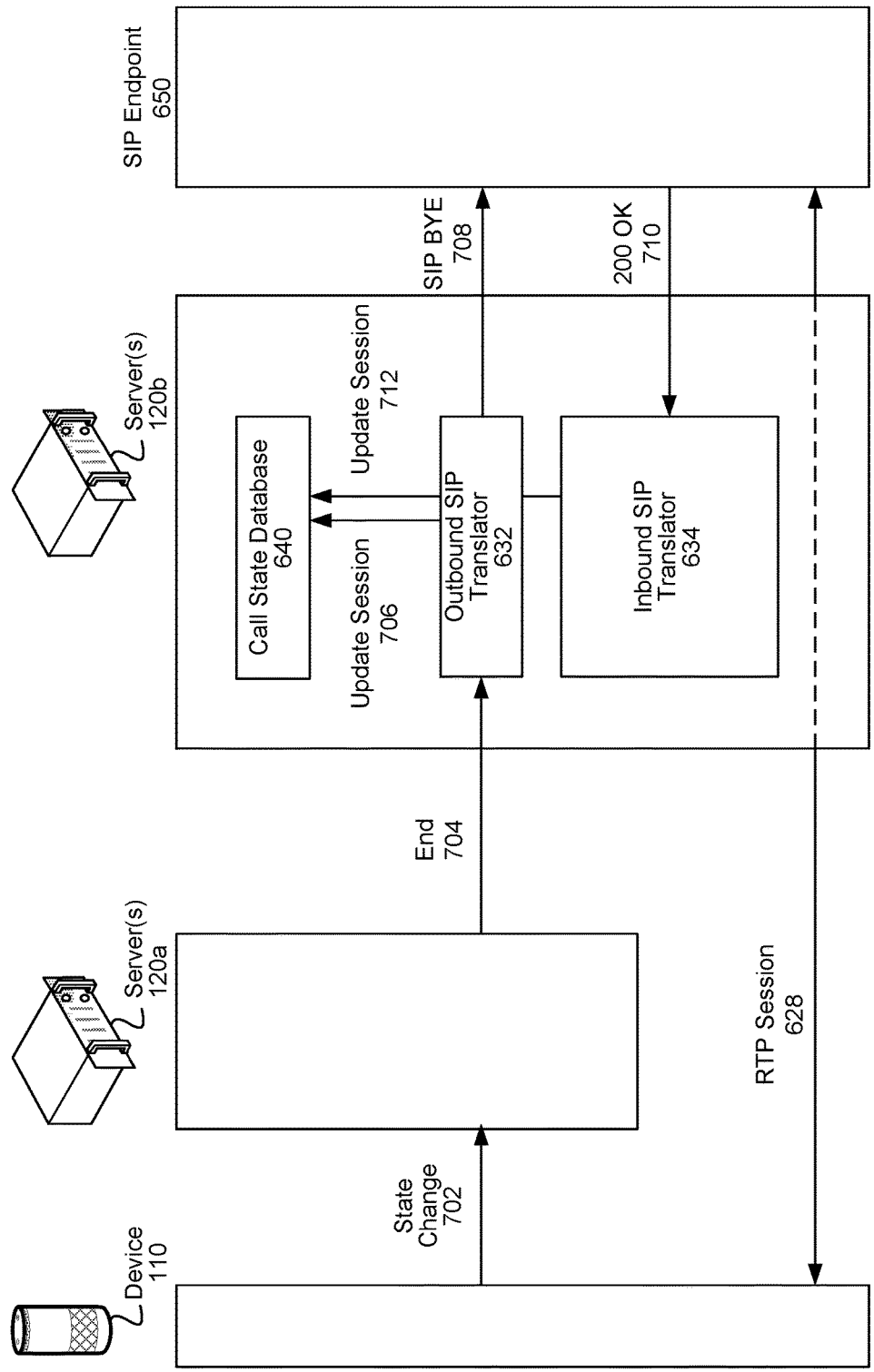

FIGS. 7A-7B illustrate examples of signaling to end a communication session according to examples of the present disclosure. After establishing the RTP communication session 628 between the device 110 and the SIP endpoint 650, the RTP communication session may be ended by the user inputting a command to end the telephone call to the device 110, as illustrated in FIG. 7A, or a remote party inputting a command to end the telephone call to the SIP endpoint 650, as illustrated in FIG. 7B.

As illustrated in FIG. 7A, the device 110 may send (702) a state change message to the server(s) 120a and the server(s) 120a may send (704) an end message to the server(s) 120b. The outbound SIP translator 632 may update (706) the session using the call state database 640 and may send (708) a SIP BYE message to the SIP endpoint 650. The SIP endpoint 650 may send (710) a 200 OK message to the inbound SIP translator 634 and the inbound SIP translator 634 may update (712) the session using the call state database 640. Thus, the RTP communication session 628 may be ended between the device 110 and the SIP endpoint 650.

As illustrated in FIG. 7B, the SIP endpoint 650 may send (752) a SIP BYE message to the inbound SIP translator 634 and the inbound SIP translator 634 may update (754) the session using the call state database 640. The inbound SIP translator 634 may send (756) a stopSending message to the server(s) 120a and the server(s) 120a may send (758) the stopSending message to the device 110. The device 110 may send (760) a state change message to the server(s) 120a and the server(s) 120a may send (762) an End message to the outbound SIP translator 632, the End message including a DSN. The outbound SIP translator 632 may then update (764) the session using the call state database 640. Thus, the RTP communication session 628 may be ended between the device 110 and the SIP endpoint 650.

While FIGS. 6, 7A and 7B illustrate the RTP communication session 628 being established between the device 110 and the SIP endpoint 650, the disclosure is not limited thereto and the RTP communication session 628 may be established between the adapter 108 and the SIP endpoint 650 without departing from the disclosure. Additionally or alternatively, the adapter 108 may be the SIP endpoint 650 and the RTP communication session 628 may be established between the device 110 and the adapter 108, such as when the device 110 is part of a telephone call using the phone network 20.

Figure 8A:
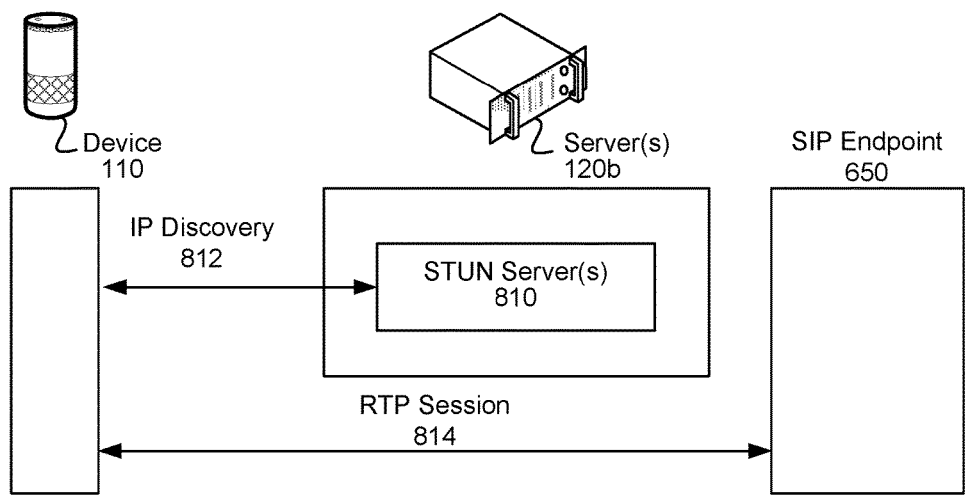
FIG. 8A-8B illustrate examples of establishing media streams between devices according to examples of the present disclosure.
Figure 8B:
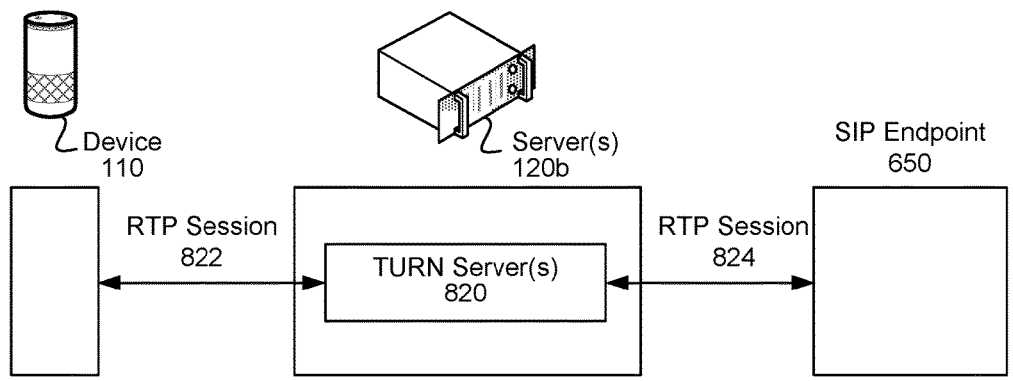

FIG. 8A-8B illustrate examples of establishing media streams between devices according to examples of the present disclosure. In some examples, the device 110 may have a publicly accessible IP address and may be configured to establish the RTP communication session directly with the SIP endpoint 650. To enable the device 110 to establish the RTP communication session, the server(s) 120b may include Session Traversal of User Datagram Protocol (UDP) Through Network Address Translators (NATs) server(s) (e.g., STUN server(s) 810). The STUN server(s) 810 may be configured to allow NAT clients (e.g., device 110 behind a firewall) to setup telephone calls to a VoIP provider hosted outside of the local network by providing a public IP address, the type of NAT they are behind and a port identifier associated by the NAT with a particular local port. As illustrated in FIG. 8A, the device 110 may perform (812) IP discovery using the STUN server(s) 810 and may use this information to set up an RTP communication session 814 (e.g., UDP communication) between the device 110 and the SIP endpoint 650 to establish a telephone call.

In some examples, the device 110 may not have a publicly accessible IP address. For example, in some types of NAT the device 110 cannot route outside of the local network. To enable the device 110 to establish an RTP communication session, the server(s) 120b may include Traversal Using relays around NAT (TURN) server(s) 820. The TURN server(s) 820 may be configured to connect the device 110 to the SIP endpoint 650 when the client 110 is behind a NAT. As illustrated in FIG. 8B, the device 110 may establish (822) an RTP session with the TURN server(s) 820 and the TURN server(s) 820 may establish an RTP session with the SIP endpoint 650. Thus, the device 110 may communicate with the SIP endpoint 650 via the TURN server(s) 820. For example, the device 110 may send outgoing audio data to the server(s) 120b and the server(s) 120b may send the outgoing audio data to the SIP endpoint 650. Similarly, the SIP endpoint 650 may send incoming audio data to the server(s) 120b and the server(s) 120b may send the incoming audio data to the device 110.

In certain situations a message sent to a recipient may include contact information or a contact identifier corresponding to contact information of the sender of the message. After receiving this specified contact information the system may prompt the message recipient for an input corresponding to a command to associate the contact information with the sender. Alternatively, the system may determine to associate the contact information with the sender without prompting the recipient. With or without the prompt, the contact information in the message may then be saved to a user profile associated with the recipient (for example in a contact entry associated with the sender). Associating the contact information with the first user may be temporary or permanent. For example, the message recipient may submit a request to temporarily associate the contact information in the message with the first user (sender of the message) for a period of time. Alternatively, the system may determine from the message content that the specified contact information (contact information included in the message) is only valid for a certain time period (for example, "call me, but I'll be at my mom's house next week"). Alternatively, the system may determine to permanently associate the specified contact information in the message with the sender, for example as a result of a request from the recipient or as a result of processing the incoming message (e.g., "I've moved! My new number is 555-1212."). A user profile corresponding to the recipient may be modified in by adding, deleting, editing or otherwise modifying any one of the contact information entries, either in a system initiated manner or in response to commands from the recipient (where the commands are spoken or input in another fashion, such as touch commands using a device 110c).

The present disclosure provides techniques for extracting contact information from a message, for associating the extracted contact information with the source of the message, and for routing new messages using the extracted contact information. A system (including one or more servers, local devices, etc.) communicates messages between speech-controlled devices. In an example embodiment, first text data may be determined, the first text data corresponding to a first message intended for a recipient. The first message may be associated with a message source associated with a first contact identifier. It may be determined that the first text data comprises a first portion corresponding to a second contact identifier that is different from the first contact identifier. To do so, the system may perform NLU processing on the first text data to determine a portion associated with contact information. Specified contact information may be contact information that is not already associated with the message source. Specified contact information may also be contact information that is indirectly associated with the message source. For example, specified contact information may be contact information associated with another device that is associated with a user who may be related to or acquainted with the message source.

For example, the system may perform NLU or similar processing on the first text data to determine that the message includes a first portion including a contact identifier, such as a telephone number, an e-mail address, a web-service address or any other numeric, alphabetical, or alphanumerical identification information corresponding to a device for speech-based communication. For example, a telephone number may be domestic or international. An e-mail address may include any e-mail address having unique text, followed by the "@" sign and followed by an extension identifying an e-mail service provider. For example, a web-service address may be a user name associated with a web-site or a web-based account profile (e.g. Facebook®, Twitter®, Yahoo®, Google®, Skype®, etc.). The system may also perform NLU or similar processing on the first text data to determine that the message includes a first portion including instructions regarding contact information (e.g., "call me at my mom's house"). In the latter situation, the system may determine a contact identifier corresponding to the instructions. For example, the system may access a user profile associated with the sender of the message to determine a contact identifier (such as the phone number of the sender's mom's house). The system may then compare the contact identifier corresponding to the message with the contact information available to the recipient of the message (e.g., contact information associated with the sender in the recipient's contact list). If the contact information does not exist with regard to the recipient's contact list, the system may store the new contact information along with an association with the sender, for example in the recipient's contact list. If the contact information is known to the recipient's contact list, the system may flag the contact information with priority for purposes of routing future messages to the original sender. Thus, in some manner the system may associate the new contact information with the message source in a manner later retrievable by the system with regard to messages to the message source from the original recipient.

In response to determining that the message source would like to be contacted by the recipient at the device corresponding to the contact information (i.e., contact identifier) included in the message, the server may notify other users associated with the message source of the message source's contact identifier preference. For example, once the system determines the message source would like to be contacted at a location associated with a contact identifier, the system may, in response to receiving other messages from other users associated with the message source, indicate the message source's contact identifier preference. The message source may be prompted by the server to authorize this type of broadcast and the message may limit this broadcast to specific users and not all users associated with the message source.

Further, NLU processing may be performed on the first text data to determine a time period during which the new contact identifier will be associated with the message source. A time indicator corresponding to the time period may be stored in a memory and made available for access. Prior to sending a further message to the message source, the system may determine that the time period has not yet expired. An notification may be provided to indicate that the time period has not yet expired prior to sending the second text data or after sending the second text data. Thus, the system may also associate time information with the contact information, particularly if such time information was obtained from performing NLU processing on the original message content (e.g., "call me at my mom's house until next Friday"). The time information may not necessarily be specified and may be based on some configuration settings of the system. For example, if a user says "call me at my mom's house" but does not specify a time period, the system may apply a configuration setting to associate a twenty-four hour time period to the contact information.

The system may route the message content to the recipient either prior to, during, and/or after the system processes the message content as described above. In this example embodiment, text-to-speech (TTS) processing may be performed on the first text data to determine output audio data corresponding to the first text data (e.g., the original message content). The output audio data may be sent to a recipient device associated with the recipient of the message. The recipient device may output audio corresponding to the message content. The recipient user may hear the message and speak an utterance including a reply to the message.

The recipient device may determine input audio data corresponding to the utterance and may send the input audio data to one or more server(s) 120. The one or more server(s) 120 may perform ASR processing on the input audio data to determine first ASR result data comprising second text data. The one or more server(s) 120 may then perform NLU processing, which may be performed on the second text data to determine a request to contact the message source. The system may then determine that the new contact information is associated with the message source and may send data corresponding to the reply communication (which may include a portion of the second text data, TTS speech based on the second data, or the like) to a device associated with the new contact information.

If the original message includes a request to contact the message source using the new contact information (e.g., "call me at my mom's house"), the system may determine prompt text data corresponding to a prompt to contact the message sender using the new contact information. For example, the system may determine prompt text of "would you like to call Jane at her mom's house," perform TTS to synthesize speech data corresponding to the prompt text, and send the speech data to the recipient's device so that the recipient's device may output the prompt speech as output audio following the audio of the message. Thus, a message of "call me at my mom's house" from Jane may be followed by a prompt created by the system to contact Jane at her mom's house. The recipient may then answer "yes" to the prompt to quickly initiate a responsive message.

The reply communication may be a communication in reply to the first message from the message source or may be a communication following the first message, but not necessarily directly in reply. The communication, may for example, include placing a phone call to the message source. The communication may include sending a voice note or voicemail message to the message source. The communication may include sending an e-mail, text, video, or any other media content to the message source.

Although illustrated in the context of spoken messages, a graphical user-interface (GUI) may be generated or rendered on a display of a device to perform certain messaging operations discussed herein. For example, the GUI may be displayed in an application to be executed on the speech-controlled device (or device) and can be an adaptation of the systems and methods described herein. The GUI may display a plurality of graphical elements corresponding to different functionalities of the systems and methods described herein. For example, the GUI may include a play icon, a stop icon, or an application icon (e.g., Alexa, etc.). Each icon may be selectable by touch or cursor identification (e.g. sliding a cursor over the icon and making a selection). Message text data may be displayed on the device. At least a portion of the displayed text data may be modified to be distinguished from the other portions of the text data. Such modification may provide an indication that other functions may be performed by interacting with the modified text. The modification may be highlighting, different typeface (e.g., bold, italics, underlined, cross-through, embossed, etc.) or different font type or size.

The application icon may indicate that more actions can be taken on the text data script of the message. For example, if the application icon is selected, a least one function icon may appear or be presented to the user to perform an action. The action may include calling, texting, e-mailing, or otherwise contacting another user. The action may also be actions specific to manipulation of the message (e.g., delete, save, rewind, pause, fast-forward, etc.).

Figure 9A:
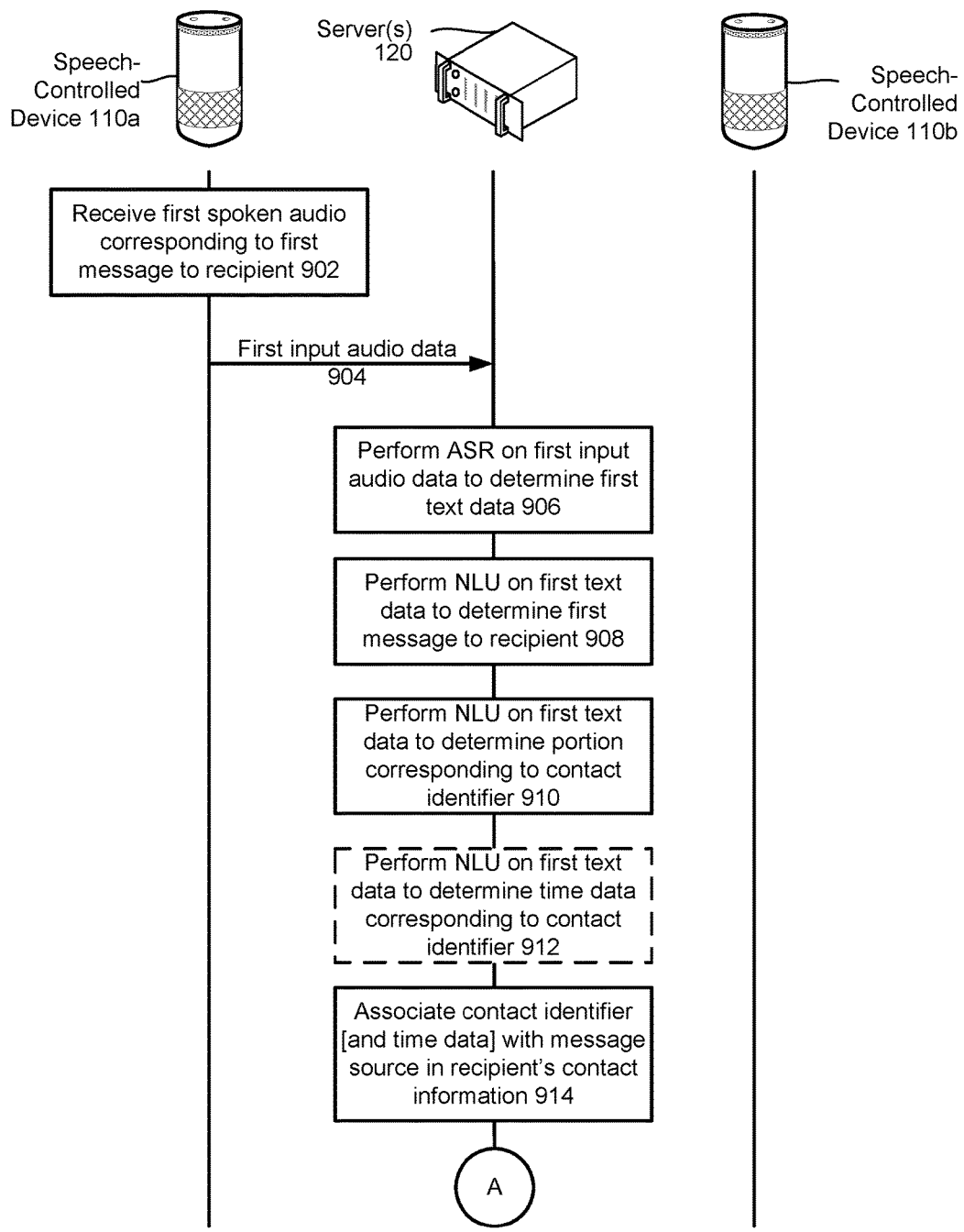

FIGS. 9A through 9C illustrate capturing contact information in a message and routing further messages using the captured contact information. A first speech-controlled device 110a receives (902) spoken audio corresponding to a first message from a message source and intended to be sent to a recipient (9. The speech-controlled device 110a sends (904) first input audio data corresponding to the captured spoken audio to the server(s) 120(9. The audio data corresponding to the captured spoken audio sent to the server 120 may include a message intended for a recipient. The input audio data may include different portions include a wakeword portion (e.g., "Alexa") as well as a command portion (e.g., "tell mom I will call later.") The command portion may include different portions as well including a header portion (e.g., "tell mom") and a payload or message portion (e.g., "I will call later.") When eventually sending a message to a recipient the system may only send portions of audio data (for example the payload, e.g., "I will call later") to a recipient.

The server 120 performs (906) ASR on the first input audio data (or received audio data) to determine first text data 300. Alternatively, the server 120 may receive the first text data 300 from an alternate messaging source such as a text-input device, other message router, or the like. The server 120 may then perform (908) NLU processing on the first text data to determine that the first text data corresponds to a message to the recipient. For example, the system may determine that the first text data includes "tell John Smith I said call me at my mom's house." According to this example, the server 120 may determine "John Smith" corresponds to recipient information, and "call me at my mom's house" as message content information.

As part of the NLU processing, the system may also perform (910) NLU processing to determine a portion of the first text data corresponds to a contact identifier. For example, the system may detect an explicitly mentioned contact identifier in the first text data (e.g., call me at "555-1212") and may identify the contact identifier using the explicit mention. Alternatively, the system may determine that some portion of text corresponds to contact information, even if a contact identifier is not explicitly mentioned. For example, the system may determine that the portion "my mom's house" corresponds to a phone number associated with the sender's mother. To determine the explicit contact identifier (e.g., the phone number of the sender's mother), the system may determine a user profile associated with the sender, may identify contact information associated with the sender's user profile, and may determine the contact identifier associated with the portion of the first text data (e.g., find the contact number of the sender's mother in the sender's contact list). For example, input text data including the text "tell John Smith I said call me at my mom's house" may be interpreted by the NLU component as follows:

intent: voice_message,
    recipeint: John Smith,
    sender_ID: Jen Kira,
    message_payload: audio_recording_starting_at_mm:ss_of_input_audio_data,
    callback: Jen_Kira's_mother's_house The system may also perform (912) NLU processing on the first text data to determine time data corresponding to the contact identifier. For example, if the message includes time information (e.g., "call me at my mother's house until next Friday") the system may identify that time information and create time data for that time information.

The system may then associate (914) the contact identifier (and time data if relevant) with the message source in a manner associated with the recipient, for example linked to a contact associated with the message source in the recipient's contact list. The recipient's contact list may include an entry corresponding to a user profile of the message source. However, if the message source requests that the recipient contact the message source using a contact identifier with no identifiable information but for a name, or if the contact identifier is unavailable, the server may issue a prompt to the message source to request additional information. For example, if the message source says, "call me at my brother's house" and a contact identifier for the brother's house is not available, the system may output audio corresponding to a prompt requesting a contact identifier (i.e., home phone number, Echo IP address, etc.) for the brother's house. This will allow the message source or sender 5 to specifically provide additional information to allow the call to be placed to the brother's house. Even further, the system if the message source provides a contact identifier that is not associated with the message source, the system may prompt the message source for an alternative contact identifier or provide new information for the contact identifier. The system may also prompt the message source on whether or not to associate the alternative contact identifier with the user profile of the message source, as described herein. The prompt executed by the system and output as audio to the message source may be provided from an speech controlled device (i.e., Echo device), a companion device (i.e., mobile device in communication with the speech controlled device), or the like.

Using the recipient information from the first message, the server 120 determines a device associated with the recipient (i.e., the speech-controlled device 110b). Turning to FIG. 9B, the system may perform (916) TTS processing on the first text data (or a portion thereof) to determine first output audio data including synthesized speech of the first message. The system may then send (918) the first output audio data to the recipient's device 110b. The recipient's device may then output (919) audio corresponding to the first message's content. Alternatively, in lieu of TTS processing, the first output audio data may correspond to the first spoken audio including the message to the message source (e.g., from step 902), thus outputting the original message content to the recipient in the sender's voice, rather than as synthesized speech. The audio data sent to the recipient device may only correspond to a payload or message portion of the original input audio data.

The recipient may then speak an utterance commanding the system to send a message back to the message source. The recipient's device 110b receives (920) second spoken audio corresponding to a second message to the message source. The recipient's device 110b may then send (922) second input audio data corresponding to the second message to the server 120. The server 120 may then perform (924) ASR processing on the second input audio data to determine second text data. The server 120 may then perform (926) NLU processing on the second text data to determine that the second text data corresponds to a command to send a second message to the message source. The server 120 may also identify (928) that the message source is associated with the contact identifier included in the first message. This can be done using the stored association resulting from 914 above. The server 120 may then identify (930) a third device associated with the contact identifier (e.g., a device associated with the message source's mother or a device associated with the phone number 555-1212).

The server 120 may also use time data (such as that determined 912 above) to determine if the contact identifier is still associated with/given priority with regard to the message source.

As shown in FIG. 9C, the server 120 may perform (932) TTS processing on the second text data (or a portion thereof) to determine second output audio data corresponding to the second message and send (934) the second output audio data to the third device 970 determined to correspond to the message source. Alternatively, in lieu of TTS processing, the second output audio data may correspond to the second spoken audio including the message to the message source (e.g., from step 920), thus outputting the second message content in the recipient's voice, rather than as synthesized speech. The server 120 may indicate to the speech-controlled device 110b that the message is being routed to an alternate device. For example, the server 120 may generate output audio data to be output as audio to the speech controlled device 110b indicating that the second message received at the speech controlled device 110b from the recipient will be sent to the third device 970 based on the specified contact identifier being included in the first message. For example, once it is determined that the second message will be sent to the third device 970, the server 120 may generate a prompt that can be output as audio from the speech controlled device 110b saying "your message will be sent to [contact identifier's name and/or number]."

In another example embodiment, if the recipient associated with the second device 110b sends a message to contact the message source using a contact identifier that is not the same as the specified contact identifier included in the second message, a conflict may exist. In response to detecting a conflict exists between the specified contact identifier provided by the recipient 7 and the new contact identifier provided in the second message, the server 120 may prompt the recipient 7 to confirm sending the second message to the new contact identifier that was not provided in the first message from the message source. The server 120 may then analyze the contact identifiers associated with the message source and provide a list of devices associated with the respective contact identifiers. The list of devices associated with the respective contact identifiers may be in an order of hierarchy based on one or more devices having a priority over one or more of the remaining devices.

FIG. 10 illustrates a method for the system to process incoming messages and alter header or other metadata within a message so that replies can be routed using specified contact identifiers within a message rather than to the original sending device. As shown in FIG. 10, a source device 110a associated with a source contact identifier can receive (1002) input corresponding to a message. The input may be spoken, may be input using a keyboard, touch screen, or other input component. The source device 110a can then create (1004) first message data corresponding to the message. The first message data can include content data including the content of the message. The first message data can also include metadata, such as a header or other metadata, indicating the source contact identifier as the source of the message, including for purposes of replying to the message. Although the source device 110a shown as creating the first message data, the first message data may also be created by a mail or message server or other component. The source device 110a (or other routing component) then sends (1006) the first message data to the server(s) 120. The server(s) 120 can then perform (910) NLU on first text data corresponding to the content data of the message. For example, if the message was a text message the first text data may be the content data. If the message was a spoken message, ASR may first be performed on audio data of the content data to determine the first text data. The server(s) 120 may determine that the first text data includes a second content identifier. The server(s) 120 may then create second message data that includes the message content data (e.g., the original content audio, text, etc.) but the second message data also includes metadata that indicates the second content identifier as the reply to address rather than the source content identifier. Thus, a recipient of the second message data who replies to the second message, will be replying using the second content identifier rather than the source content identifier. The server(s) 120 may then send (1012) the second message data (rather than the first message data) to the receiving device 110b.

The server(s) 120 may also store data indicating that the source contact identifier should, at least temporarily, be replaced with the second contact identifier for purposes of routing new messages. For example, the server(s) 120 may receive new message data from some other sender where the new message data includes new content to be sent to a destination of the source contact identifier. The server(s) 120 may create altered new message data that includes the new content but with routing information for the new message data to be sent to a destination of the second contact identifier. The server(s) 120 may then send the altered new message data instead of the original new message data.

While the server(s) 120 of FIGS. 9A-9C and 10 may be a part of a single system, they may be part of separate systems, for example a speech processing system using server(s) 120a and a communications routing system using server(s) 120b. Depending on the system configuration, the operations described herein may be split between the systems. For example, a speech processing system using server(s) 120a may perform (910) the NLU processing to determine that the first text includes a portion corresponding to a contact identifier and may then send routing data to a communications system using server(s) 120b where the routing data indicates that future communications to the original sender (for example, from the original recipient) should be sent using the contact identifier included in the first message. The communication server(s) 120b may then use that routing data to identify (930) the third device 970 associated with the contact identifier and send (934) the second output data to the third device 970.

To identify a particular user operating a device, the system may use one or more various techniques. In one example, a device capturing audio may be associated with a user profile, which in turn is associated with a user. The system may thus identify the speaking user based on the user profile. For example, if audio is received from speech-controlled device 110a, which is associated with user profile 502a, which is associated with User A, the system may determine the speaker of the audio is User A. The system may also perform speaker recognition using the audio data to match the audio data to one or more known voice samples of a user. Such speaker recognition may include using speech recognition data (such as ASR confidence data, or the like) in determining an identity of a speaker. The system may also perform facial recognition by matching an image of a speaker to stored images (or related data) of known users. The system may also detect nearby companion devices (for example, a smart watch being worn by a user speaking to device 110a) by detecting Received Signal Strength Indicator (RSSI) or other wireless communication information. The system may also match authorization data (e.g., password, fingerprint, username, etc.) used to access the sending device 110*a* in order to identify a user.

Figure 12:
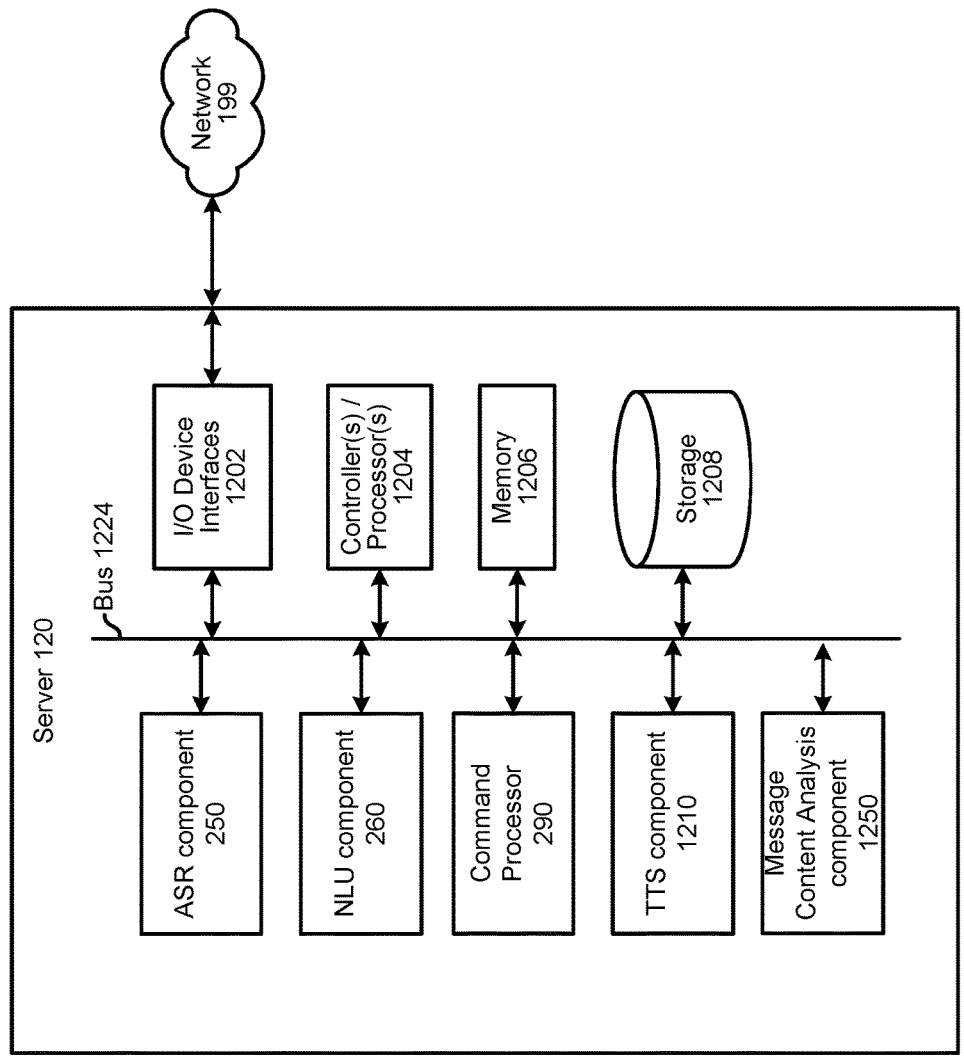
FIG. 12 is a block diagram conceptually illustrating example components of a server according to embodiments of the present disclosure.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 11 and 12, are exemplary, and may be located as a stand-alone device or may be included, in whole or in part, as a component of a larger device or system. For example, multiple different physical servers 120 may combine to perform ASR processing, multiple other different physical servers 120 may combine to perform NLU processing, or the like with various operations discussed herein.

FIG. 11 is a block diagram conceptually illustrating a user device 110 (for example speech-controlled devices 110*a* and 110*b* as herein described) that may be used with the described system. FIG. 12 is a block diagram conceptually illustrating example components of a remote device, such as a remote server 120 that may assist with ASR processing, NLU processing, or command processing. Multiple such servers 120 may be included in the system, such as one server(s) 120 for performing ASR processing, one server(s) 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to the device 110 of FIG. 11, the device 110 may include a display 1118, which may comprise a touch interface 1119 configured to receive limited touch inputs. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1102 that connect to a variety of components such as an audio output component such as a speaker 101, a wired headset or a wireless headset (not illustrated) or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 (using microphone 103, wakeword detection component 220, ASR component 250, etc.) may be configured to determine audio data corresponding to detected audio data. The device 110 (using input/output device interfaces 1102, antenna 1114, etc.) may also be configured to transmit the audio data to server 120 for further processing or to process the data using internal components such as a wakeword detection component 220.

For example, via the antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR component 250. The ASR component in device 110 may be of limited or extended capabilities. The ASR component 250 may include the language models 254 stored in ASR model storage component 252, and an ASR component 250 that performs the automatic speech recognition process. If limited speech recognition is included, the ASR component 250 may be configured to identify a limited number of words, such as keywords detected by the device, whereas extended speech recognition may be configured to recognize a much larger range of words.

The device 110 and/or server 120 may include a limited or extended NLU component 260. The NLU component in device 110 may be of limited or extended capabilities. The NLU component 260 may comprising the name entity recognition component 262, the intent classification component 264 and/or other components. The NLU component 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection component 220, which may be a separate component or may be included in an ASR component 250. The wakeword detection component 220 may receive audio signals and may detect occurrences of a particular expression (such as a configured keyword) in the audio as explained above.

To create output speech, the server 120 may be configured with a text-to-speech ("TTS") component 414 that transforms text data into audio data representing speech as explained above.

The server may also include a message content analysis component 1250 which may analyze incoming messages to obtain contact information and process that contact information as described above. The message content analysis component 1250 may be part of the NLU component 260. For example, a message including text data corresponding to contact information may be sent to the server(s) 120. Upon receipt of the message, the server(s) 120 may, using the message content analysis component 1250, perform processing on the message to parse or extract the contact information. The extracted contact information may be identified as corresponding to a specific category or entry type corresponding to a contact entry. For example, the message may include the text, "call me at my mom's house." The message content analysis component 1250 may extract the text "mom's house" and identify that text as corresponding to contact information, and then determine a contact identifier associated with "mom's house." Similarly, text that includes an explicit contact identifier (such as "call me at 555-1212") may be processed by the message content analysis component 1250 to determine the contact identifier ("555-1212"). The extracted contact information/resulting contact identifier may be processed and stored in a manner where the contact identifier, message source and recipient are associated (e.g., in a contact entry corresponding to the message sender's mom in the contact list of the recipient).

The message content analysis component 1250 may operate using a combination of rules and one or more machine learning trained models to process message content and determine if contact information is included or referred to in the message content. Such rules/models may recognize explicit contact identifiers (e.g., phone numbers, text numbers, email address, web accounts, etc.), contact expressions (e.g., "call me at," "ping me," or the like), contact-related time information ("next week," "until Friday," etc.) or other information regarding routing of messages. Various machine learning techniques may be used to perform the training of the message content analysis component 1250 or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

The message content analysis component 1250 may thus use a machine learning trained model to process message content to be sent to a recipient device and determine if contact information is included. The message content analysis component 1250 may thus use a machine learning trained model to link the contact information to potential new messages originating from the original recipient, or otherwise linking the contact information to existing contact information or otherwise storing the contact information for future use.

Figure 13:
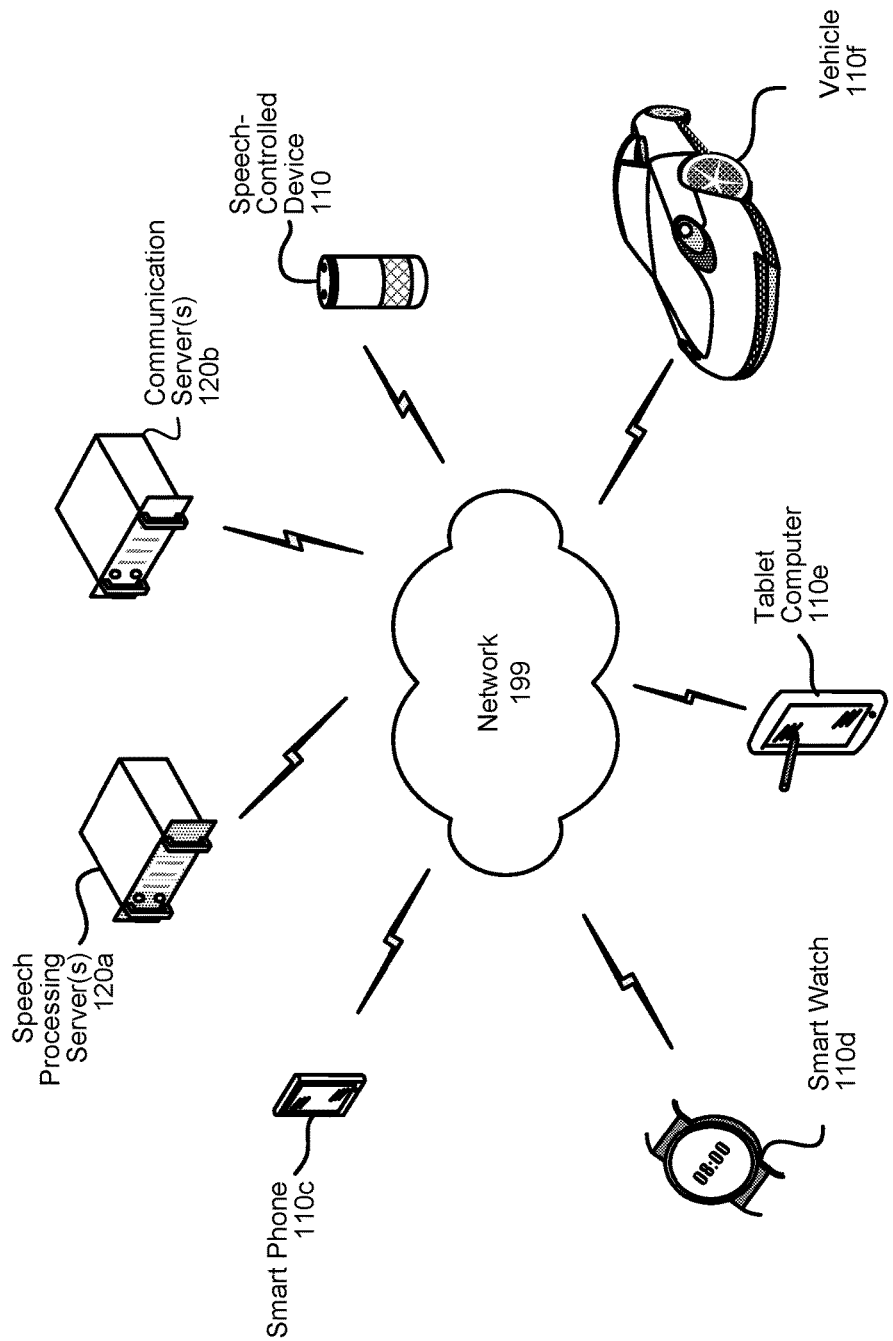
FIG. 13 illustrates an example of a computer network for use with the system of the present disclosure.

As illustrated in FIG. 13 multiple devices (120, 110, 110c-110f) may contain components of the system 100 and the devices may be connected over a network 199. Network 199 may include a local or private network or may include a wide network such as the Internet. Devices may be connected to the network 199 through either wired or wireless connections. For example, a speech controlled device 110, a tablet computer 110e, a smart phone 110c, a smart watch 110d, and/or a vehicle 110f may be connected to the network 199 through a wireless service provider, over a WiFi or cellular network connection or the like. Other devices are included as network-connected support devices, such as a server 120, application developer devices, or others. The support devices may connect to the network 199 through a wired connection or wireless connection. Networked devices 110 may capture audio using one-or-more built-in or connected microphones 103 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device associated with a first phone number and with a sender, first input audio data;
   performing
   speech processing on the first audio data to determine a request to send a first message to a recipient, the first message including a content portion indicating a location;
   determining, using a contact list associated with a user profile of the sender, a second phone number corresponding to the location;
   determining that the second phone number is different from the first phone number;
   creating message data comprising a portion of the first input audio data and metadata including reply destination data corresponding to the second phone number;
   sending the message data to a third device associated with the recipient;
   receiving, from the third device, second input audio data;
   processing the second input audio data to determine a request to reply to the sender;
   identifying, using the metadata, the second phone number; and
   routing, using the metadata, a reply communication to the second device.

2. The computer-implemented method of claim 1, further comprising:
   identifying a contact list associated with a user profile of the recipient;
   identifying, in the contact list, a contact entry corresponding to the sender, the contact entry including the first phone number; and
   storing the second phone number with the contact entry.

3. The computer-implemented method of claim 1, wherein the first text data does not expressly include the second phone number.

4. A computer-implemented method comprising:
   determining first message data comprising first text data corresponding to content of a message and first metadata including a source contact identifier;
   processing the first text data to determine that the first text data indicates a location;
   determining, using the first text data, a second contact identifier corresponding to the location, wherein the second contact identifier is different from the source contact identifier;
   creating second message data comprising data corresponding to the content and second metadata including reply destination data corresponding to the second contact identifier;
   receiving a request to reply to the message; and
   determining, based on the second metadata, to route a reply communication to a device associated with the second contact identifier.

5. The computer-implemented method of claim 4, wherein the method further comprises:
   causing the second message data to be sent to a second device associated with a recipient of the message;
   receiving, from the second device, input audio data;
   performing automatic speech recognition (ASR) processing on the input audio data to determine ASR result data comprising second text data;
   performing NLU processing on the ASR result data to determine NLU result data comprising the second text data;
   determining the NLU result data corresponds to the request to reply to the message; and
   sending to the first device the reply communication.

6. The computer-implemented method of claim 4, wherein the method further comprises:
   receiving, from a second device associated with the source contact identifier, input audio data corresponding to the message;
   performing automatic speech recognition (ASR) on the input audio data to determine the first text data;
   performing text-to-speech (TTS) processing on the first text data to determine output audio data; and
   including the output audio data in the second message data.

7. The computer-implemented method of claim 4, further comprising:
   identifying a contact list associated with a user profile of a recipient of the message;
   identifying, in the contact list, a contact entry corresponding to a sender of the message, the contact entry including the source contact identifier; and
   associating the second contact identifier with the contact entry.

8. The computer-implemented method of claim 7, further comprising:
   performing NLU processing on the first text data to determine a time period associated with the second contact identifier; and
   storing, with the contact entry, a time indicator corresponding to the time period.

9. The computer-implemented method of claim 4, wherein the first text data does not expressly include the second contact identifier.

10. The computer-implemented method of claim 4, wherein the request to reply to the message does not include the second contact identifier.

11. The computer-implemented method of claim 4, wherein:
    the first metadata includes the source contact identifier as a reply to address; and
    creating the second message data comprises replacing the source contact identifier with the second contact identifier as the reply: to address.

12. The computer-implemented method of claim 4, wherein routing a reply communication to the device includes causing a call to be initiated with the device.

13. The computer-implemented method of claim 4, wherein routing a reply communication to the device includes sending a reply message to the device.

14. A computing system comprising:
at least one processor;
a memory including instructions operable to be executed by the at least one processor to configure the system to:
   determine first message data comprising first text data corresponding to content of a message and first metadata including a source contact identifier;
   process the first text data to determine that the first text data indicates a location;
   determine, using the first portion, a second contact identifier corresponding to the location, wherein the second contact identifier is different from the source contact identifier;
   create second message data comprising data corresponding to the content and second metadata including reply destination data corresponding to the second contact identifier;
   receive a request to reply to the message; and
   determine, based on the second metadata, to route a reply communication to a device associated with the second contact identifier.

15. The computing system of claim 14, wherein the memory further includes instructions that further configure the system to:
   cause the second message data to be sent to a second device associated with a recipient of the message;
   receive, from the second device, input audio data;
   perform automatic speech recognition (ASR) processing on the input audio data to determine ASR result data comprising second text data;
   perform NLU processing on the ASR result data to determine NLU result data comprising the second text data;
   determine the NLU result data corresponds to the request to reply to the message; and
   send to the first device the reply communication.

16. The computing system of claim 14, wherein the memory further includes instructions that further configure the system to:
   receive, from a second device associated with the source contact identifier, input audio data corresponding to the message;
   perform automatic speech recognition (ASR) processing on the input audio data to determine the first text data; and
   perform text-to-speech (TTS) processing on the first text data to determine output audio data; and
   include the output audio data in the second message data.

17. The computing system of claim 14, wherein the memory further includes instructions that further configure the system to:
   identify a contact list associated with a user profile of a recipient of the message;
   identify, in the contact list, a contact entry corresponding to a sender of the message, the contact entry including the source contact identifier; and
   associate the second contact identifier with the contact entry.

18. The computing system of claim 17, wherein the memory further includes instructions that further configure the system to:
   perform NLU on the first text data to determine a time period associated with the second contact identifier; and
   store, with the contact entry, a time indicator corresponding to the time period.

19. The computing system of claim 14, wherein the first text data does not expressly include the second contact identifier.

* * * * *